(12) United States Patent
Jacobsen et al.

(10) Patent No.: US 8,378,924 B2
(45) Date of Patent: Feb. 19, 2013

(54) MONOCULAR DISPLAY DEVICE

(75) Inventors: Jeffrey J. Jacobsen, Hollister, CA (US); Stephen A. Pombo, Campbell, CA (US)

(73) Assignee: Kopin Corporation, Taunton, MA (US)

( * ) Notice: Subject to any disclaimer, the term of this patent is extended or adjusted under 35 U.S.C. 154(b) by 1256 days.

(21) Appl. No.: 12/008,114

(22) Filed: Jan. 8, 2008

(65) Prior Publication Data

US 2008/0291277 A1 Nov. 27, 2008

Related U.S. Application Data

(60) Provisional application No. 60/880,270, filed on Jan. 12, 2007, provisional application No. 60/930,242, filed on May 15, 2007, provisional application No. 60/962,686, filed on Jul. 31, 2007, provisional application No. 60/999,801, filed on Oct. 19, 2007.

(51) Int. Cl.
*G09G 5/00* (2006.01)
(52) U.S. Cl. ............................... 345/7; 345/8
(58) Field of Classification Search .............. 345/7–9; 381/364, 370, 381; 348/115
See application file for complete search history.

(56) References Cited

U.S. PATENT DOCUMENTS

| | | | |
|---|---|---|---|
| 3,953,114 A * | 4/1976 | Bidgood | |
| 4,201,316 A | 5/1980 | Klingaman | |
| 5,235,979 A | 8/1993 | Adams | |
| 5,515,070 A | 5/1996 | Kawada | |
| 5,806,526 A | 9/1998 | Rhoad | |
| 5,812,977 A | 9/1998 | Douglas | |
| 5,815,126 A | 9/1998 | Fan et al. | |
| 5,831,664 A | 11/1998 | Wharton et al. | |
| 5,844,656 A | 12/1998 | Ronzani et al. | |
| 5,867,817 A | 2/1999 | Catallo et al. | |
| 5,873,070 A | 2/1999 | Bunte et al. | |
| 5,886,822 A | 3/1999 | Spitzer | |
| 5,909,183 A | 6/1999 | Burgstahl et al. | |
| 5,949,351 A | 9/1999 | Hahm | |
| 5,990,793 A | 11/1999 | Bieback | |
| 5,995,936 A | 11/1999 | Brais et al. | |
| 6,023,372 A | 2/2000 | Spitzer et al. | |
| 6,046,712 A | 4/2000 | Beller et al. | |
| 6,073,034 A | 6/2000 | Jacobsen et al. | |
| 6,091,546 A | 7/2000 | Spitzer | |
| 6,108,197 A | 8/2000 | Janik | |

(Continued)

FOREIGN PATENT DOCUMENTS

| | | |
|---|---|---|
| CN | 1435707 | 8/2003 |
| CN | 1685273 | 10/2005 |

(Continued)

OTHER PUBLICATIONS

United States Office Action, Nov. 23, 2010, U.S. Appl. No. 12/008,103.

(Continued)

*Primary Examiner* — Regina Liang
(74) *Attorney, Agent, or Firm* — Hamilton, Brook, Smith & Reynolds, P.C.

(57) ABSTRACT

A head mounted support system for a head mounted apparatus. The apparatus includes a monocular display with a wireless communications interface, a user input device, a transmitter, receiver and a controller. The controller is configured to control the transmitter for sending and receiving control signals to and from an external device via the wireless interface. The monocular display is positioned relative to the user's dominant eye to display images to the user while occluding less than half of the user's maximum viewing space, while enabling the user to send and receive audible information or music. The head mounted support system may include an ear loop, and a housing for storing one or more functional components of the apparatus.

35 Claims, 19 Drawing Sheets

U.S. PATENT DOCUMENTS

| | | | |
|---|---|---|---|
| 6,148,241 A | 11/2000 | Ludtke et al. | |
| 6,167,413 A | 12/2000 | Daley, III | |
| 6,181,304 B1 | 1/2001 | Robinson et al. | |
| 6,204,974 B1 | 3/2001 | Spitzer | |
| 6,212,020 B1* | 4/2001 | Ahlgren et al. | 345/8 |
| 6,216,158 B1 | 4/2001 | Luo et al. | |
| 6,229,503 B1 | 5/2001 | Mays, Jr. et al. | |
| 6,232,937 B1 | 5/2001 | Jacobsen et al. | |
| 6,292,158 B1 | 9/2001 | Amafuji et al. | |
| 6,295,479 B1 | 9/2001 | Shima et al. | |
| 6,304,234 B1 | 10/2001 | Horiuchi | |
| 6,325,507 B1 | 12/2001 | Jannard et al. | |
| 6,339,706 B1 | 1/2002 | Tillgren et al. | |
| 6,349,001 B1 | 2/2002 | Spitzer | |
| 6,356,392 B1 | 3/2002 | Spitzer | |
| 6,356,437 B1 | 3/2002 | Mitchell et al. | |
| 6,359,602 B1 | 3/2002 | Amafuji et al. | |
| 6,369,952 B1 | 4/2002 | Rallison et al. | |
| 6,384,982 B1 | 5/2002 | Spitzer | |
| 6,433,760 B1 | 8/2002 | Vaissie et al. | |
| 6,445,363 B1 | 9/2002 | Urisaka | |
| 6,448,944 B2 | 9/2002 | Ronzani et al. | |
| 6,452,572 B1 | 9/2002 | Fan et al. | |
| 6,456,892 B1 | 9/2002 | Dara-Abrams et al. | |
| 6,462,882 B2 | 10/2002 | Chen et al. | |
| 6,486,862 B1 | 11/2002 | Jacobsen et al. | |
| 6,487,021 B1 | 11/2002 | Ophey | |
| 6,507,762 B1 | 1/2003 | Amro et al. | |
| 6,522,474 B2 | 2/2003 | Cobb et al. | |
| 6,529,331 B2 | 3/2003 | Massof et al. | |
| 6,535,182 B2 | 3/2003 | Stanton | |
| 6,538,624 B1 | 3/2003 | Karasawa et al. | |
| 6,545,654 B2 | 4/2003 | Jacobsen et al. | |
| 6,608,884 B1 | 8/2003 | Mazess et al. | |
| 6,618,099 B1 | 9/2003 | Spitzer | |
| 6,622,018 B1 | 9/2003 | Erekson | |
| 6,633,267 B2 | 10/2003 | Numa | |
| 6,636,185 B1 | 10/2003 | Spitzer et al. | |
| 6,653,989 B2 | 11/2003 | Nakanishi | |
| 6,674,493 B2 | 1/2004 | Shaw | |
| 6,677,936 B2 | 1/2004 | Jacobsen et al. | |
| 6,680,802 B1 | 1/2004 | Ichikawa et al. | |
| 6,690,338 B1 | 2/2004 | Maguire, Jr. | |
| 6,697,200 B2 | 2/2004 | Nagaoka | |
| 6,710,928 B2 | 3/2004 | Roest | |
| 6,724,354 B1 | 4/2004 | Spitzer et al. | |
| 6,727,865 B1 | 4/2004 | Yonezawa | |
| 6,734,834 B1 | 5/2004 | Baram | |
| 6,738,535 B2 | 5/2004 | Kanevsky et al. | |
| 6,745,253 B2 | 6/2004 | Struble | |
| 6,747,611 B1 | 6/2004 | Budd et al. | |
| 6,751,026 B2 | 6/2004 | Tomono | |
| 6,753,828 B2 | 6/2004 | Tuceryan et al. | |
| 6,757,719 B1 | 6/2004 | Lightman et al. | |
| 6,762,885 B1 | 7/2004 | Ogasawara et al. | |
| 6,771,423 B2 | 8/2004 | Geist | |
| 6,771,424 B1 | 8/2004 | Amafuji et al. | |
| 6,795,421 B1 | 9/2004 | Heinonen et al. | |
| 6,798,391 B2 | 9/2004 | Peterson, III | |
| 6,816,314 B2 | 11/2004 | Shimizu et al. | |
| 6,822,623 B2 | 11/2004 | Kim et al. | |
| 6,825,987 B2 | 11/2004 | Repetto et al. | |
| 6,834,192 B1 | 12/2004 | Watanabe et al. | |
| 6,847,489 B1 | 1/2005 | Wu | |
| 6,853,293 B2 | 2/2005 | Swartz et al. | |
| 6,868,360 B1 | 3/2005 | Olstad et al. | |
| 6,879,443 B2 | 4/2005 | Spitzer et al. | |
| 6,880,931 B2 | 4/2005 | Moliton et al. | |
| 6,899,539 B1 | 5/2005 | Stallman et al. | |
| 6,900,777 B1 | 5/2005 | Hebert et al. | |
| 6,904,570 B2 | 6/2005 | Foote et al. | |
| 6,922,184 B2 | 7/2005 | Lawrence et al. | |
| 6,947,014 B2 | 9/2005 | Wooten | |
| 6,947,219 B1 | 9/2005 | Ou | |
| 6,947,975 B2 | 9/2005 | Wong et al. | |
| 6,956,614 B1 | 10/2005 | Quintana et al. | |
| 6,963,379 B2 | 11/2005 | Tomono | |
| 6,963,454 B1 | 11/2005 | Martins et al. | |
| 6,966,647 B2 | 11/2005 | Jannard et al. | |
| 6,972,735 B2 | 12/2005 | Hebert | |
| 6,975,991 B2 | 12/2005 | Basson et al. | |
| 6,977,630 B1 | 12/2005 | Donath et al. | |
| 6,982,683 B2 | 1/2006 | Stanton | |
| 6,987,620 B2 | 1/2006 | Nagaoka | |
| 6,999,239 B1 | 2/2006 | Martins et al. | |
| 7,001,058 B2 | 2/2006 | Inditsky | |
| 7,002,534 B2 | 2/2006 | Park | |
| 7,004,582 B2 | 2/2006 | Jannard et al. | |
| 7,013,009 B2 | 3/2006 | Warren | |
| 7,019,715 B1 | 3/2006 | Kasai et al. | |
| 7,038,235 B2 | 5/2006 | Seitz | |
| 7,050,078 B2 | 5/2006 | Dempski | |
| 7,061,449 B2 | 6/2006 | Oya et al. | |
| 7,063,256 B2 | 6/2006 | Anderson et al. | |
| 7,075,501 B1 | 7/2006 | Spitzer et al. | |
| 7,081,999 B2 | 7/2006 | Yamazaki | |
| 7,082,393 B2 | 7/2006 | Lahr | |
| 7,088,234 B2 | 8/2006 | Naito et al. | |
| 7,088,516 B2 | 8/2006 | Yagi et al. | |
| 7,113,151 B2 | 9/2006 | Kinebuchi | |
| 7,119,965 B1 | 10/2006 | Rolland et al. | |
| 7,121,467 B2 | 10/2006 | Winter et al. | |
| 7,126,558 B1 | 10/2006 | Dempski | |
| 7,143,785 B2 | 12/2006 | Maerkl et al. | |
| 7,145,726 B2 | 12/2006 | Geist | |
| 7,147,324 B2 | 12/2006 | Jannard et al. | |
| 7,148,860 B2 | 12/2006 | Kooi et al. | |
| 7,150,526 B2 | 12/2006 | Jannard et al. | |
| 7,155,556 B2 | 12/2006 | Kim et al. | |
| 7,158,096 B1 | 1/2007 | Spitzer | |
| 7,199,934 B2 | 4/2007 | Yamasaki | |
| 7,213,917 B2 | 5/2007 | Jannard et al. | |
| 7,216,973 B2 | 5/2007 | Jannard et al. | |
| 7,219,994 B2 | 5/2007 | Jannard et al. | |
| 7,231,038 B2 | 6/2007 | Warren | |
| 7,249,846 B2 | 7/2007 | Grand et al. | |
| 7,269,183 B2 | 9/2007 | Morris | |
| 7,278,734 B2 | 10/2007 | Jannard et al. | |
| 7,321,354 B1 | 1/2008 | Jacobsen et al. | |
| 7,331,666 B2 | 2/2008 | Swab et al. | |
| 7,445,332 B2 | 11/2008 | Jannard et al. | |
| 7,452,073 B2 | 11/2008 | Jannard et al. | |
| 7,461,936 B2 | 12/2008 | Jannard | |
| 7,494,216 B2 | 2/2009 | Jannard et al. | |
| 7,512,414 B2 | 3/2009 | Jannard et al. | |
| 7,542,012 B2 | 6/2009 | Kato et al. | |
| 7,642,990 B2* | 1/2010 | Todd et al. | 345/7 |
| 7,682,018 B2 | 3/2010 | Jannard | |
| 7,740,353 B2 | 6/2010 | Jannard | |
| 7,744,213 B2 | 6/2010 | Jannard et al. | |
| 7,753,520 B2 | 7/2010 | Fuziak, Jr. | |
| 7,798,638 B2 | 9/2010 | Fuziak, Jr. | |
| 7,806,525 B2 | 10/2010 | Howell et al. | |
| 7,918,556 B2 | 4/2011 | Lewis | |
| 7,966,189 B2 | 6/2011 | Le et al. | |
| 7,967,433 B2 | 6/2011 | Jannard et al. | |
| 7,969,383 B2 | 6/2011 | Eberl et al. | |
| 7,969,657 B2 | 6/2011 | Cakmakci et al. | |
| 7,988,283 B2 | 8/2011 | Jannard | |
| 8,010,156 B2 | 8/2011 | Warren | |
| 8,020,989 B2 | 9/2011 | Jannard et al. | |
| 8,025,398 B2 | 9/2011 | Jannard | |
| 8,072,393 B2 | 12/2011 | Riechel | |
| 8,098,439 B2 | 1/2012 | Amitai et al. | |
| 8,140,197 B2 | 3/2012 | Lapidot et al. | |
| 8,212,859 B2 | 7/2012 | Tang et al. | |
| 2002/0015008 A1 | 2/2002 | Kishida et al. | |
| 2002/0074370 A1 | 6/2002 | Quintana et al. | |
| 2002/0094845 A1 | 7/2002 | Inasaka | |
| 2003/0068057 A1 | 4/2003 | Miller et al. | |
| 2004/0113867 A1 | 6/2004 | Tomine et al. | |
| 2004/0125047 A1 | 7/2004 | Crane et al. | |
| 2005/0264527 A1 | 12/2005 | Lin | |
| 2006/0119539 A1 | 6/2006 | Kato et al. | |
| 2006/0132382 A1 | 6/2006 | Jannard | |
| 2007/0048697 A1 | 3/2007 | Du et al. | |
| 2008/0198324 A1 | 8/2008 | Fuziak | |

| | | | |
|---|---|---|---|
| 2009/0128448 A1 | 5/2009 | Riechel | |
| 2009/0154719 A1 | 6/2009 | Wulff et al. | |
| 2009/0180195 A1 | 7/2009 | Cakmakci et al. | |
| 2010/0020229 A1 | 1/2010 | Hershey et al. | |
| 2010/0171680 A1 | 7/2010 | Lapidot et al. | |
| 2010/0271587 A1 | 10/2010 | Pavlopoulos | |
| 2010/0289817 A1 | 11/2010 | Meier et al. | |
| 2011/0254698 A1 | 10/2011 | Eberl et al. | |
| 2011/0255050 A1 | 10/2011 | Jannard et al. | |
| 2012/0013843 A1 | 1/2012 | Jannard | |
| 2012/0105740 A1 | 5/2012 | Jannard et al. | |

FOREIGN PATENT DOCUMENTS

| | | |
|---|---|---|
| EP | 1 544 665 A1 | 6/2005 |
| EP | 1633146 A1 | 3/2006 |
| JP | 9-504120 | 4/1997 |
| JP | 10-301055 A | 11/1998 |
| JP | 2004-080679 A | 3/2004 |
| JP | 2004-358092 A | 12/2004 |
| JP | 2006-005804 A | 1/2006 |
| JP | 2006-197734 A | 7/2006 |
| JP | 2006-217520 A | 8/2006 |
| WO | WO 95/11473 A1 | 4/1995 |
| WO | WO 95/21408 | 8/1995 |
| WO | WO 95/23994 | 9/1995 |
| WO | WO 00/79327 | 12/2000 |
| WO | WO2008/013111 A1 | 1/2008 |
| WO | WO 2009/076016 | 6/2009 |

OTHER PUBLICATIONS

Further Search Report of GB0913858.7 dated Jul. 13, 2011.
Wang, X., "Video Streaming over Bluetooth," Institute for Infocoram Research (12R), School of Computing, National University of Singapore (2004).
Written Opinion of the International Searching Authority, for Application No. PCT/US2008/000245, 13 pages, dated Jul. 23, 2009.

* cited by examiner

MONOCULAR DISPLAY DEVICE

CROSS REFERENCE TO RELATED PATENT APPLICATIONS

This application claims priority to U.S. Provisional Patent Application No. 60/880,270 to Jacobsen et al., filed on Jan. 12, 2007, which is herein incorporated by reference in its entirety.

This application also claims priority to U.S. Provisional Patent Application No. 60/930,242 to Jacobsen et al., filed on May 15, 2007, which is herein incorporated by reference in its entirety. This application also claims priority to U.S. Provisional Patent Application No. 60/962,686 to Jacobsen et al., filed on Jul. 31, 2007, which is herein incorporated by reference in its entirety.

Further, this application also claims priority to U.S. Provisional Patent Application No. 60/999,801 to Jacobsen filed on Oct. 19, 2007, which is herein incorporated by reference in its entirety.

BACKGROUND OF THE INVENTION

Head-worn display devices are known in the art. Typically, the display is a small color monitor arranged to present images to a user's left eye, right eye, or both. These devices often surround the user's face or head and thus not only are heavy but also occlude substantially all of the user's vision. In other words, while wearing the display, the user generally cannot easily view other objects in the user's normal peripheral vision or loses substantial portions of normal peripheral vision during use. Other head worn displays may include two separate displays, one for each eye, that are also supported on a heavy frame.

While, these devices can provide a high-resolution display of images and sound, occlusion of the user's normal viewing space, or a majority thereof can be problematic. The user will typically only use the display in a few, select locations where that user perceives the location to be safe, for example, in a living room, elsewhere in the home, in a work space while seated or standing or in a substantially fixed location. Users cannot efficiently perform many other day to day tasks when wearing an occlusive display device. These tasks include participating in activities requiring moderate to high personal mobility, requiring frequent depth perception adjustments, moving through areas with irregular and uneven surfaces or requiring active collision avoidance (i.e., personally moving through areas or events with constantly changing obstacles, crowds, avoiding fast moving objects that may be encountered, while operating vehicles, negotiating the use of public transportation) or any circumstance where personal safety maybe sacrificed by loss of normal peripheral vision.

Secondly, such prior art head worn displays are limiting in certain limited tasks. Such tasks can include viewing images, graphics or movies with audio. This can be for gaming purposes or recreational viewing of images from a television broadcast or video. Such prior art head worn displays are severely limited in connection with other day-to-day desired functional computing tasks. For example, the user may desire using the display in connection with communication tasks, running business applications, active navigation tasks, mobile instruction with real time updates or using the display to wirelessly control other devices that the user regularly uses or comes in contact with on a day to day basis. These devices can include such as, for example, a Personal Digital Assistant, a notebook computer, a desktop computer, a mobile phone, a vehicle, a wireless network, wireless service hot spot, thin client, other electronic device or an appliance. Such prior art head worn displays often cannot interface with or slave such devices to initiate and control running programs, initiate real time device functional changes, alter real time device operational parameters, enable local or remote wireless communication with mobile devices and/or engage with wireless networks and services.

Thirdly, such prior art devices are not readily upgradeable to provide other functions that the user may desire. A user may desire, in some locations, to have some functional attributes of one or more particular software applications or one or more particular hardware configurations, while in other locations the user may not desire to have those software applications or hardware configurations. In fact, the user may not use such a heavy display device with multiple software applications or hardware configurations, and instead may wish to remove unnecessary software and hardware from the device so the device remains ultra lightweight.

Accordingly, there is a need in the art for a monocular device that does not occlude large portions of the user's normal viewing space to prevent or discourage the user from wearing the device in the user's day-to-day normal activities. There is also a need in the art for a device that provides for other functions besides viewing images or graphics and that can be user upgradeable so the user can select and choose which hardware or software components the user desires to interface with the device. There is also a need in the art for a monocular device that only occludes less than ten percent of the user's normal vision, while leaving about ninety percent or more of the user's vision free from obstruction. It is appreciated that the wearer has a view of vertical and horizontal vision, and that in one embodiment about ninety percent of the wearer's vision in the horizontal is free from obstruction. There is also a need in the art for a device that can be easily moved from a displayed position to a stowed position without removing the device from the wearer's head. There is also a need in the art for a device that does not completely immerse the user in video and audio so the user cannot perform other day to day tasks.

SUMMARY OF THE INVENTION

According to a first aspect, there is provided an apparatus. The apparatus has a monocular display and a support structure that user adjustable band member wraps around the back of the users head, with two user adjustable ear loops one supported on each of the wearer's ears. The loops include a first ear loop connected to a user adjustable member that wraps around the back of the user's head and is connected to a second ear loop, and which distributes the monocular display device overall weight evenly on the user's head.

The display can be telescopically connected to a housing by a telescoping arm with the housing connected to an ear loop that supports the display.

The user adjustable band member can be a bar that extends along a rear of the wearer's head, and the band can be collapsible for storing the apparatus. The display can be a video capable display enclosed in an optical housing which is pivotally connected to a housing that is connected to at least one of the ear loops.

In one non-limiting embodiment, the monocular device may be supported in multiple locations. In one embodiment, the multiple locations may include at least three locations. Firstly, the display optical housing may includes a nose bridge support that gently rests on the nose of the wearer, similar to a pair of eyeglasses. The nose bridge support may extend from the display optical housing. Secondly, the display optical housing may include an ear loop or similar device. The ear loop supports the body of the display optical housing around the head by contacting an ear of the wearer.

Thirdly, the device may also include a band member. The band member may extend all of the way around the rear of the head of the wearer, half way around the head, three quarters around the rear of the head, or one-quarter around the rear of the head of the wearer. Preferably, the band member extends around rear of the wearer's cranium generally near where the occipital bone of the skull is located.

Prior art head mounted displays that are not properly balanced and supported on the users head the device will have a tendency to perhaps pull off of the head of the wearer when the wearer adjusts the display; however, the instant device by using a three point support system with an adjustable band member disposed about the rear of the user's head with result in a device that will comfortably rest on the user's head and will resist the tendency to tilt off the vertical axis. Preferably, the rear band member, the ear loop and the nose bridge form substantially a conformal "C" clamp relative to the wearer's head. The ear loop includes a cushion that contacts the ear of the wearer, and the user adjustable band member may also include a cushion or plural cushions.

According to another aspect of the present disclosure, there is provided a head mounted monocular display support system, which is convertible from a right eye display to a left eye display. The support system comprising a frame with a rear support, a first ear loop, a second ear loop, and a cantilever support for connecting a display with the rear support. The first ear loop is rotatably connected to the rear support. The second ear loop is also rotatably connected to the rear support. The cantilever support that supports the display in a front of the user is moveable about a pivot relative to the rear support. The frame is suitable for viewing the display with right eye and the frame is convertible for viewing the display with the left eye. The support system is convertible by rotating the first and the second ear loops and by inverting the entire frame 180° degrees. The frame preferably is made from a lightweight material.

The first ear loop, and the second ear loop are cushioned to be comfortable when worn around the head of the wearer. The head mounted monocular display support system can also have a member that connects the cantilevered support to the rear support. The member includes a pivot to permit the rotation of the cantilevered support relative to the member. The cantilevered support can also be slidably supported relative to the rear member. The rear member may also have a hollow interior for housing a component of the monocular display device. The first and second ear loops and the rear member together form a conformal C shaped clamp on the wearer's head. The first ear loop is substantially "U" shaped, and the second ear loop is also substantially "U" shaped. Alternatively, the first and second ear loops can also be substantially curved shaped.

According to another aspect of the present disclosure, there is provided a head mounted monocular display support system that is convertible from a right eye display to a left eye display. The system has an ear loop and a rear support. The rear support connects to the ear loop and extends around the head of the wearer. The support system also has a cantilevered support member. The cantilevered support member is for supporting a display in front of the user, and the support member is also connected to the ear loop.

A first pivot is located between the cantilevered support member and the ear loop. A second pivot is located between the ear loop and the rear support. The head mounted monocular display support system is suitable for viewing the display with the right eye, and is convertible for viewing the display with the left eye by rotating the cantilevered support arm by the first pivot and by rotating the rear support by the second pivot. A member can be located at an end of the rear frame opposite the second pivot. The member is for resting on an ear of the wearer.

The member also includes an interior space for housing a component. Additionally, the ear loop can also include an interior space for housing a component. The support member also is configured for adjustment in a direction, generally longitudinally disposed relative to the ear loop. The cantilevered support includes a pivot arrangement. The pivot arrangement connects the cantilevered support to the ear loop. The cantilevered support member is spaced near an ear of the wearer and includes an interior, which may house an electronic component of the monocular display device. For example, the component can be a transducer.

In yet a further aspect of the present disclosure, there is provided a method of converting a right eye display to a left eye display. The method includes providing a first ear loop and a second ear loop on a frame with the frame also including a member for supporting a display in front of first eye. The method includes rotating the first ear loop relative to the frame and rotating the second ear loop relative to the frame. The method also includes inverting the frame and supporting the rotated first and second ear loops on the ears of the wearer so the display is associated with the opposite eye.

In yet another aspect of the present disclosure, there is provided a method of converting right eye display to a left eye display. The method includes providing a display in front of a first eye of a wearer, and connecting the display by a first pivot to an ear loop supported on a first ear. Ear loop is also connected to a rear support member by a second pivot. The method then includes rotating the display about the first pivot, and rotating the rear support by the second pivot to invert both the display and the rear support so the device will fit on the opposite side of the head of the wearer. The method then also includes supporting the ear loop on the opposite ear so the display is in front of the opposite eye so the device is supported comfortably on the head of the wearer.

According to another aspect, there is provided a head mounted monocular display support system that is convertible from a right eye display to a left eye display. The system includes a frame that has a rear support. The system also has an ear loop, an intermediate member, a display support, and a display. The rear support is connected to the ear loop for supporting the ear loop on a first ear. The intermediate member is connected to an opposite end of the ear loop relative to the rear support. The intermediate member is connected to the display support, and the display is connected to the display support. The frame is suitable for viewing the display with a first eye. The frame is convertible for viewing the display with an opposite eye by rotating the display about the intermediate member about 180 degrees and supporting the ear loop on an opposite ear.

According to another aspect, there is provided a head mounted monocular display that has a display being arranged relative to a wearer's eye, a housing connected to the display, and an ear loop. The ear loop is connected to the housing and substantially surrounds an ear of the wearer. The ear loop supports the display relative to the wearer's eye in a cantilever manner, or supported from the ear of the wearer.

In yet another aspect, there is provided a head mounted monocular display that has a display being arranged relative to a wearer's eye, a housing connected to the display, and an ear loop. The ear loop is connected to the housing. The ear loop substantially surrounds an ear of the wearer and supports the display relative to the wearer's eye in a first location. The display can be supported in another location, such as on the face of the wearer, and includes a support member connected to at least one of the display and the housing. The support member supports the display in a different location than the first location.

In yet a further aspect, there is provided an apparatus that has a monocular display, a support structure that includes a plurality of ear loops supported on each of the wearer's ears, and that supports at least the monocular display. The ear loops include a first ear loop connected to a member that is connected to a second ear loop. The member extends along a portion of the wearer's head to distribute an overall weight of the apparatus.

In another aspect, there is provided a head mounted monocular display that has a display arranged relative to a wearer's eye, a housing connected to the display by a link, and a support member that is connected to the housing. The support member supports the display relative to the wearer's eye.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1A:
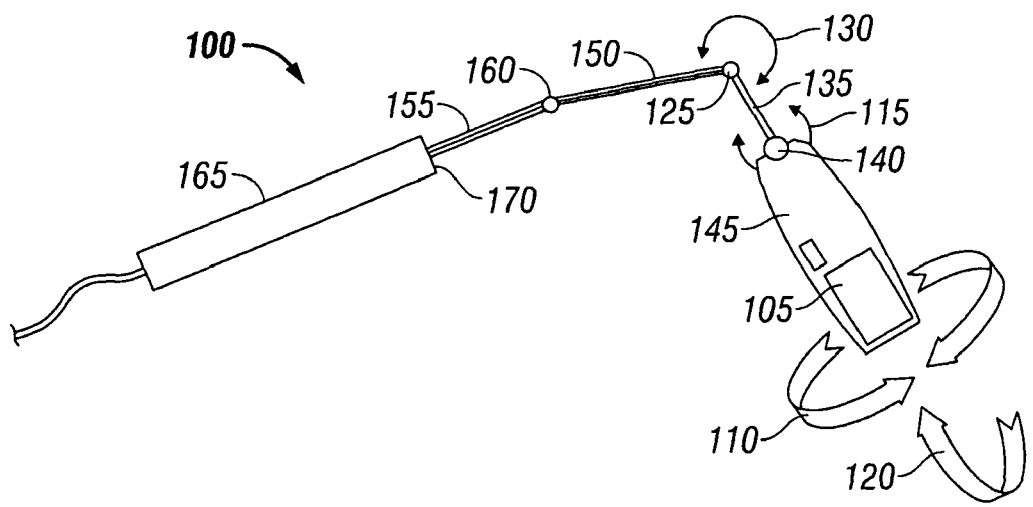
FIGS. 1A through 1E show the monocular display device including a display housing that articulates and telescopes relative to a body portion.
Figure 1B:
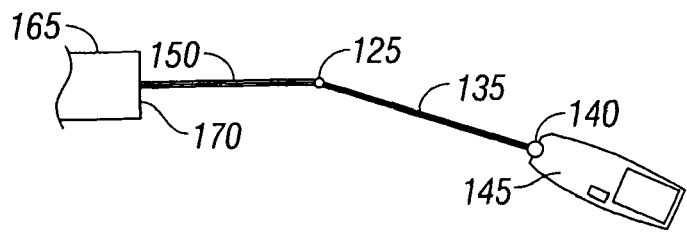
Figure 1C:
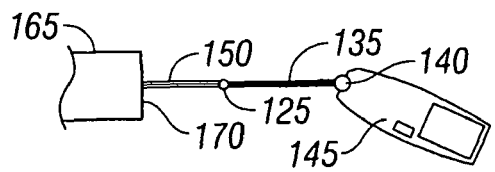
Figure 1D:
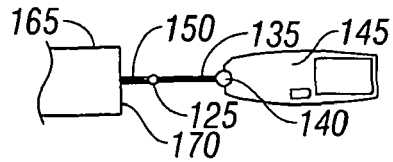
Figure 1E:
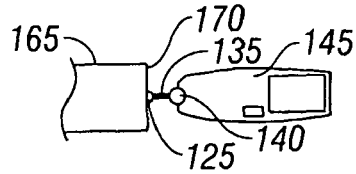

Turning now to FIG. 1A and FIG. 1B, there is shown an embodiment of a monocular display device 100. The monocular display device 100 preferably is a lightweight computing device that can be disposed in proximity to a user's dominant eye to view images.

In one embodiment, the monocular display device 100 includes a display 105 that is a micro-display component such as, for example, a liquid crystal display, a light emitting diode display, an organic light emitting diode based display, a cholesteric display, a electro-luminescent display, an electrophoretic or an active matrix liquid crystal display. Various lightweight and high-resolution display configurations are possible and within the scope of the present disclosure.

In one preferred embodiment, the display component 105 may be a WVGA display sold under the trade name "CYBERDISPLAY WVGA LV"® manufactured by the instant Assignee. The display component 105 can be a color filter, wide format, active matrix liquid crystal display having a resolution of 854×480. The display component 105 in this embodiment can be 0.54 inches in the diagonal dimension. In another embodiment, the display component 105 may alternatively include a VGA display sold under the trade name "CYBERDISPLAY VGA"® which is also manufactured by the instant Assignee. The display component 105 can be a color filter, active matrix liquid crystal display having a resolution of 640×480. The display component 105 in this embodiment can be about 0.44 inches in the diagonal dimension and lightweight.

In a further embodiment, the display component 105 can be a 0.44 inch diagonal SVGA display with about 800×600 resolution, a wide SVGA display with about 852×600 resolution, an XVGA display with about 1,024×768 resolution, an SXGA display with 1,280×1,024 resolution or High Definition Television display with either 1,400×720 resolution or full 1,920×1,080 resolution.

The monocular display device 100 preferably includes the ability to use an input/output device (not shown) to control the monocular display device 100. Using the input/output device, the monocular display device 100 may form a master/slave relationship with other devices using a wired or wireless link or interface. This interface may include a BLUETOOTH® wireless interface protocol, Wi-Fi, a cellular interface, an infrared interface, a television broadcast interface, a closed circuit connection interface, a radio broadcast interface, a satellite wireless interface, a USB wired interface, RS-232 and/or RS-485 wired interfaces, an Ethernet interface, a telephone line interface, a modem interface, a digital subscriber line interface, a cable interface, or a personal area network interface. In this manner, a user may use the input/output device (not shown) together with the monocular display device 100 to control other suitable devices using a master/slave relationship such as a notebook or desktop computer, a Personal Digital Assistant, an appliance, a network device, a music player, an audio or video device, a Global Positioning System device, a mobile device, a digital camera, a video camera, an audio device or any other type of digital or analog device.

The present monocular display device 100 preferably has program instructions stored on a memory to form a computer networking master/slave relationship with other devices using a communication protocol in which the monocular display device 100 controls one or more other devices or processes, and once the master/slave relationship is established, the direction of control is directed from the monocular display device 100 to the desired components. In this manner, the user need not carry heavy secondary components and may simply control those secondary components using the primary lightweight monocular display device 100 over a wireless interface.

In that aspect, the monocular display device 100 may include a processor (not shown), a memory, and a bus including a wireless interface. The wireless interface may include a transmitter/receiver or transceiver and be compatible for communications with personal area networks and such devices using short-range radio frequency signals. In one preferred embodiment, the wireless interface may communicate using a BLUETOOTH® radio standard, flexible Ultra Wideband (UWB) or using other radio frequency communication standards for low or flexible power consumption and compatibility. In another embodiment, the monocular display device 200 may communicate using Wi-Fi.

Turning now to FIGS. 1A through 1E, the monocular display device 100 includes a support structure 155, 150, 135. Support structure 155, 150, 135 is suitable such that the monocular device 100 may be configured to rotate in multiple planes to arrange a viewing display 105 in various viewing positions relative to the user. In this manner, the user has multiple independent degrees of articulation to properly position the display 105 in a comfortable viewing position.

The monocular display device 100 may be configured to rotate about the y-axis as shown by reference arrow 110 or may be configured to rotate about the z-axis as shown by reference arrow 115. The monocular display device 100 may be configured to rotate about the x-axis as shown by reference arrow 120. The monocular display device 100 may further be configured to additionally rotate about a pivot 125 or in the direction of reference arrow 130 to further adjust to one or more comfortable viewing positions.

The support structure 155, 150, 135 of the monocular display device 300 includes a first arm 135 connected by a pivot 140 to a display housing 145. The first arm 135 is connected to the second arm 150 by pivot 125. The second arm 150 is configured to connect to a third arm 155 by a third pivot 160 to form an articulating linkage. The third arm 155 is configured to extend in a first body portion 165 through aperture 170. First body portion 165 may include a hook to connect to a pair of glasses, or an ear loop (not shown), which is discussed herein.

In one embodiment, the third arm 155 may be configured to engage a track (not shown) in the first portion 165 to guide the third arm 155 into position. Advantageously, the monocular display device 100 may be configured to be quickly and easily move from the extended position shown in FIG. 1A (or retracted in a telescoping relationship) to the stowed position shown in FIG. 1E without removing the device from the head.

The first through third arms 135, 150 155 may be arranged in a telescoping arrangement so the first arm 135 fits into the second arm 150 and the second arm 150 fits into the third arm 155. Preferably, the display housing 145 is resilient so the user may grasp the display housing 145 to position the support structure 155, 150, 135 into the body portion 165. Alternatively, the third arm 155 may be biased so the support structure 105 may automatically retract into the body portion 165 using a button or similar device to actuate the automatic retraction as shown in the progression of FIGS. 1A through 1E. It should be appreciated that the monocular display device of the previously described embodiments may be powered using batteries suitable for a low power portable operation.

Figure 2:
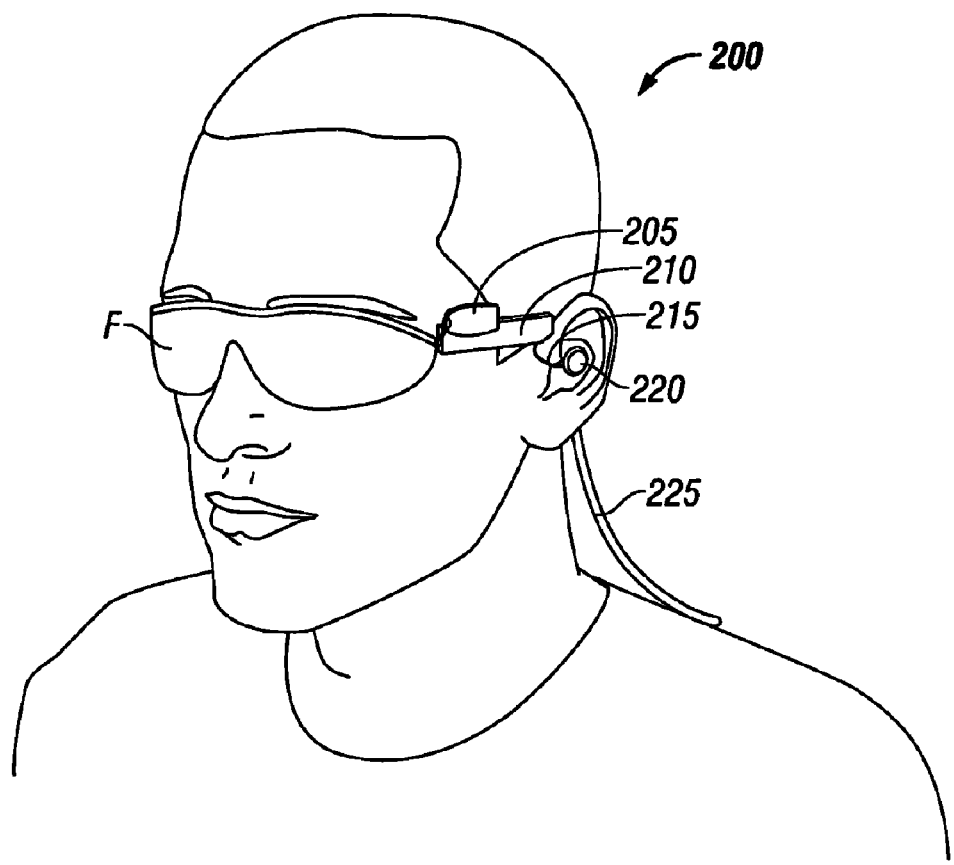
FIG. 2 shows one embodiment of the monocular display device with a display housing in a stowed position and with the monocular display device being connected to a lanyard interface.

Turning now to FIG. 2, there is shown the monocular device 200 having a display housing 205 placed in a stowed position. As can be seen, the wearer in this non-limiting embodiment is wearing a pair of eyeglasses having frames F. The monocular display device 200 also has a body portion 210 that includes an engagement or clipping structure. This clip removably connects the body portion 210 to the frame F. The engagement structure is suitable such that the wearer can pull the display housing 205 into the viewing position with ease without disengaging the body portion 210 from the frame F. The engagement structure is also suitable such that the wearer can return the display housing 205 from the viewing position to the stowed position (where the display housing 205 is disposed adjacent to the body portion 210 of the monocular display device 200) without any disengagement from the frame F.

The body portion 210 also can house an audio component, such as speakers and/or can house an audio jack or port (not shown). The port in the body portion 210 is connected (by a wired connection 215) to an earpiece 220 (or ear bud transducer) so the user may play audio using the device 200.

It should be appreciated that other peripheral or secondary components may not be desired to be located on frame F. Additional peripheral components may cause the device 200 to become heavier and uncomfortable, or cause the frame F to fall from the user's face. In this aspect, the monocular display device 200 further includes a lanyard strap interface 225 with an interior that houses one or more electronic components for wired, fiber optic interface, or wireless connection to the monocular device 200. The lanyard interface 225 preferably provides increased functionality by allowing the user to store one or more additional devices or components therein for use with the monocular display device 200 without adding weight to the frame F.

In this embodiment, the lanyard interface 225 may provide additional features for the monocular device 200 that permit the lanyard interface 225 to carry slightly heavier items that would not be appropriate for housing in the display housing 205 or the body portion 210. In this aspect, the lanyard interface 225 may provide additional features such as increased battery life, increased memory functions, increased sensing features or other previously described components or new different components. The lanyard interface 225 preferably connects to either side of the eyeglass frame F, but also has an interior and provides for space for the additional components. The lanyard interface 225 may include wiring to a secondary auxiliary battery, additional sensors, additional rear view cameras, a lightweight solid-state memory, a bus, or a processor.

In another aspect, the lanyard interface 225 may act as a pass-through for wiring components to the other opposite eyeglass frame F. In this aspect, the lanyard 225 may communicate with an auxiliary secondary housing (not shown) that is removably connected to the opposite eyeglass frame F by a different clip or fastener.

Figure 3A:
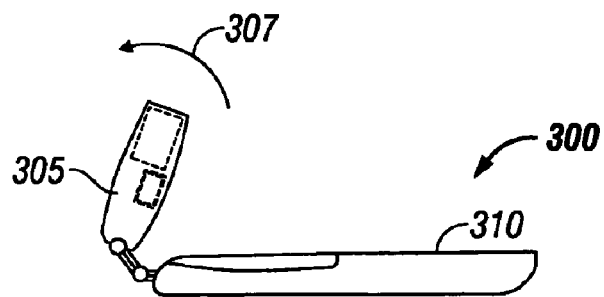
FIGS. 3A through 3E show an embodiment of the monocular display device with the display being manipulated from a stowed position to a position on the wearer for viewing images.
Figure 3B:
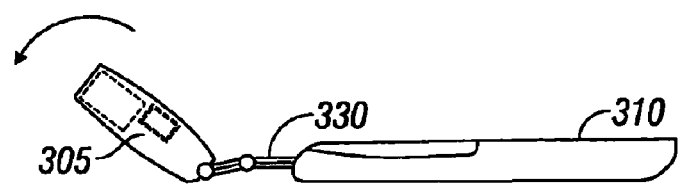

Turning now to FIG. 3A through 3E, there is shown a method of operation of moving the monocular device 300 from the stowed position to the viewing position. Referring now to FIG. 3A, the wearer can reach and grab the display housing 305 and move the display housing 305 in the direction of reference arrow 307. Thereafter, as shown in FIG. 3B, the wearer can continue the counterclockwise movement to rotate the display housing 305 in the direction of reference arrow 307. Once the display housing 305 has rotated enough or has rotated to a position to be in the peripheral view of the wearer's dominant eye, the wearer will move the second arm portion 330 from the body portion 310. This extends the second arm portion 330 in a telescopic manner as shown.

Figure 3C:
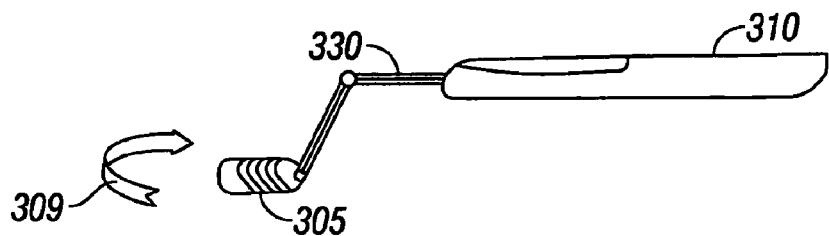
Figure 3D:
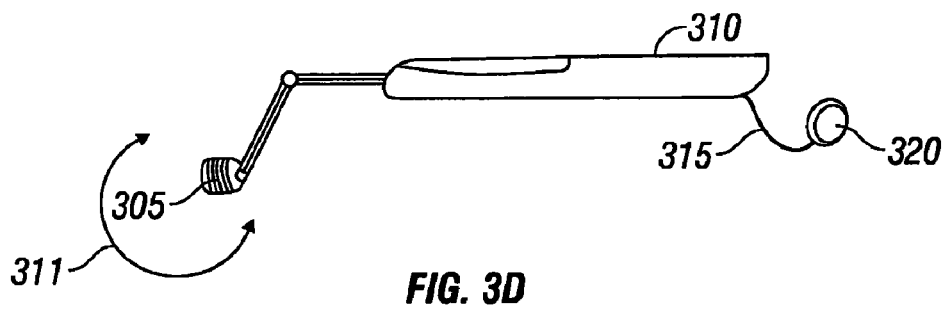
Figure 3E:
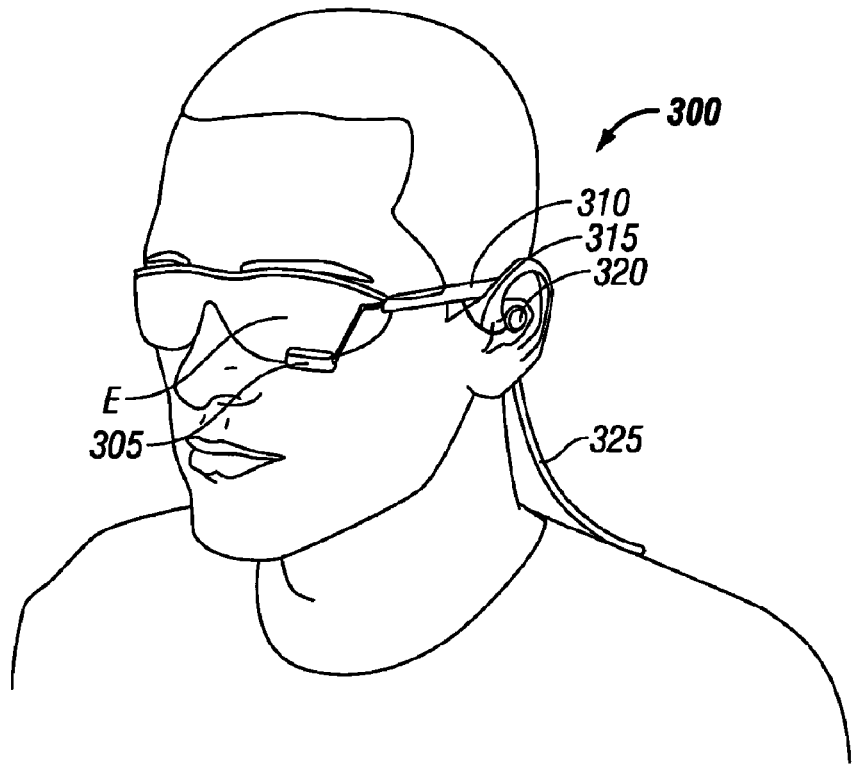

Turning now to FIGS. 3C through 3D, the display housing 305 of the monocular display device 300 (that includes the display 605) may be rotated in the direction of reference arrow 309, and be swiveled in the direction of reference arrow 311 to position the monocular display device 300 in the predetermined position relative to the user's dominant eye as shown in FIG. 3E. As mentioned, the predetermined position is suitable such that the user may view the images peripherally, or with the user's dominant eye E, while simultaneously not occluding more than ten to twenty percent of the viewer's total field of view or vision and leaving about ninety to ninety-five percent of the user's vision free and clear from obstruction.

Figure 4:
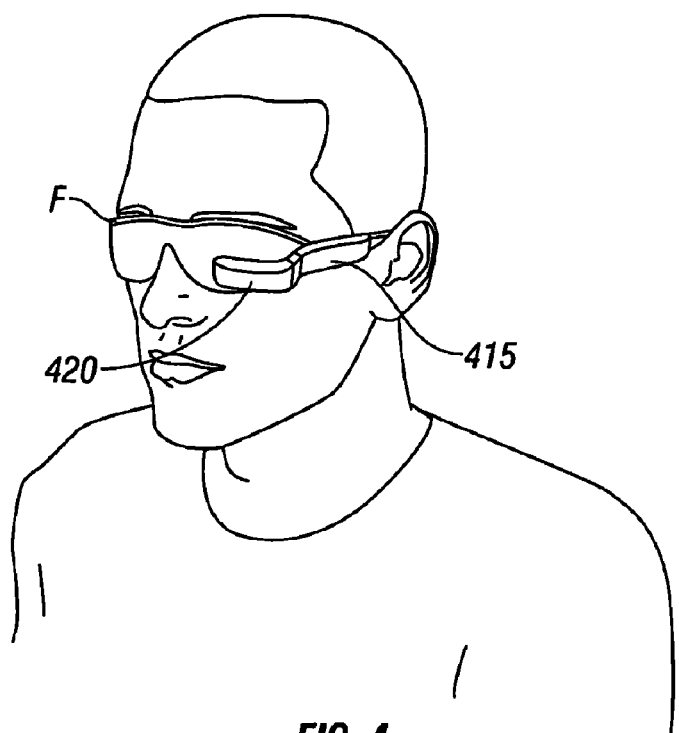
FIG. 4 show a perspective view of the monocular device of a first embodiment.

In the embodiment shown in FIG. 4, the monocular display device 420 includes a lanyard interface and the lanyard interface may act as a conduit for which a lead may pass through to communicate with the secondary auxiliary housing (not shown). In this embodiment, the device 420 may include a clip 415 that may removably clip to an eyeglass frame.

Figure 5A:
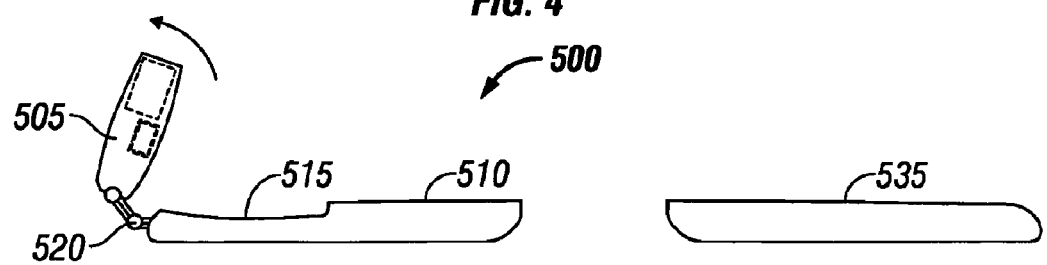
FIGS. 5A through 5C show another embodiment of the monocular display device with the device including a body portion having a receiving slot.

Turning to another alternative embodiment of the monocular display device 500 shown in FIG. 5A, there is shown the monocular display device 500 having a display housing 505 connected to a body portion 510. In this embodiment, the body portion 510 includes a receiving slot 515. The receiving slot 515 is a section of the body portion 510 that has a relatively narrower cross section than a remainder of the body portion 510. The receiving slot 515 is configured to receive the display housing 505 and for stowing a portion of the display housing 505 in a protected manner.

Figure 5B:
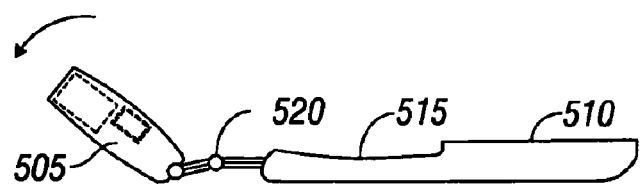
Figure 5C:
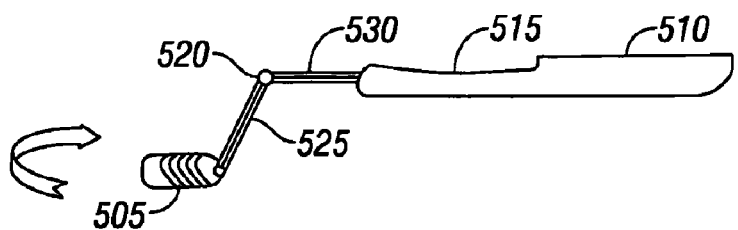

In this embodiment of FIGS. 5A through 5C, the display housing 505 can pivot from the receiving slot 515 about pivot 520 in order to rotate in a direction from the stowed position to the viewing position shown in FIG. 5C. As discussed previously, first and second arms 525, 530 that connect the display housing 505 to the body portion 510 may extend in a telescoping manner from the body portion 510 to move the display housing 505 into the viewing position as shown in FIG. 5C. In the FIG. 5A embodiment, the monocular display device 500 may further include a secondary auxiliary housing for clipping to another side of the eyeglass frame F as shown and discussed previously in FIG. 4. Second auxiliary housing may further include additional electronic components as discussed and is connected to the monocular display device 500 in the manners previously described (by using a wireless protocol, networked relationship or a wired interface).

Figure 6:
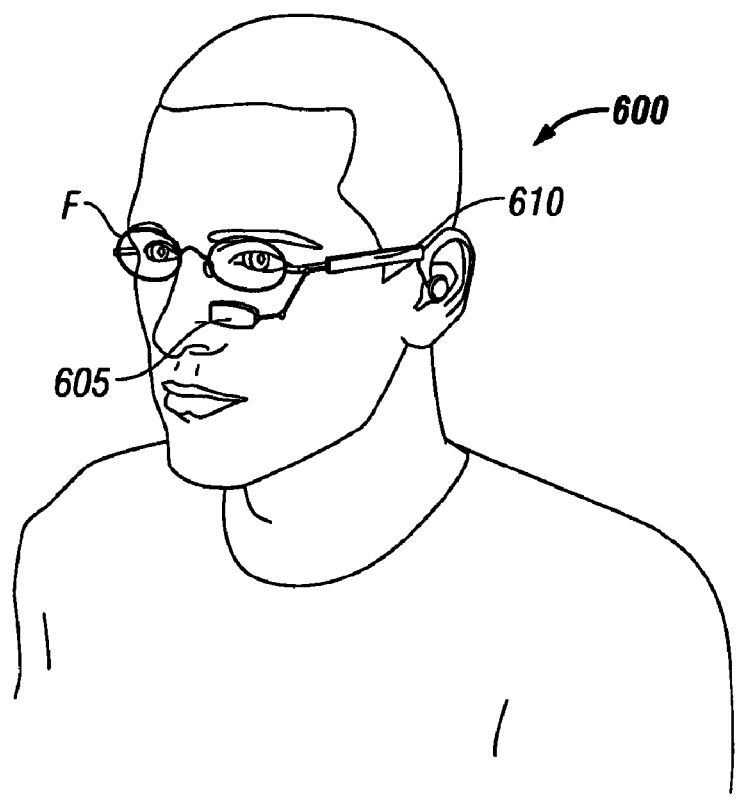
FIG. 6 shows another embodiment of the monocular display device according to the present disclosure.

Turning now to FIG. 6, the monocular display device 600 may be configured to be selectively attachable to either the brim B of a baseball cap or an eyeglass frame F. In this embodiment, the wearer may interchange between supporting the device 600 on the brim B and/or the eyeglass frame F. Here, the wearer may remove the monocular display device 600 from the brim B using a clip to connect the monocular display device 600 (having the display housing 605 in the viewing position) to the eyeglass frame F as shown. Various support configurations are possible and within the scope of the present disclosure. In one embodiment, an auxiliary body portion (not shown) may be supported on a garment, while the monocular display device 600 is supported on the frame F to provide for increased functionality to the user, and provide a compact and balanced arrangement.

Figure 7:
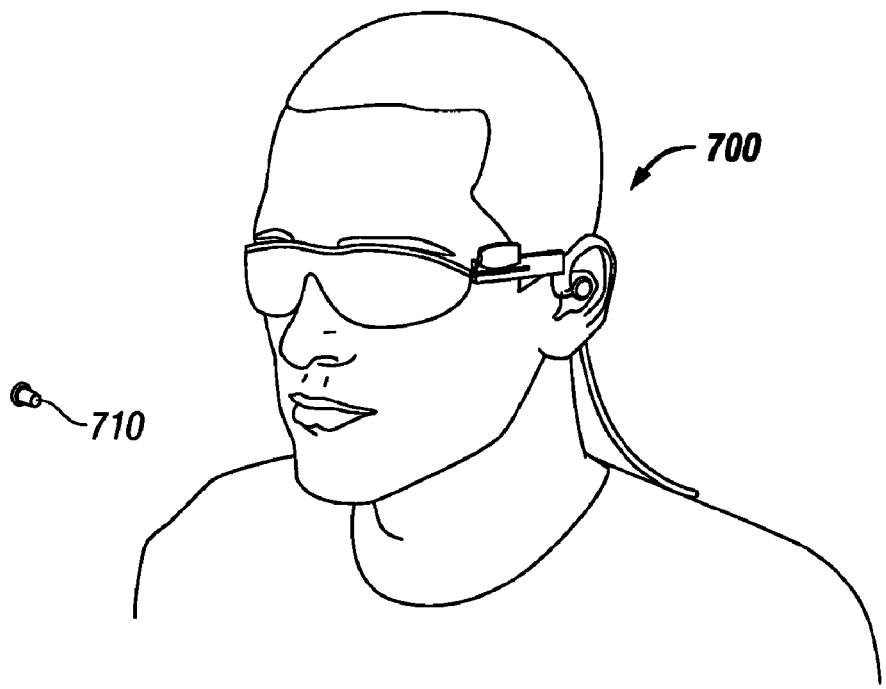
FIG. 7 shows another embodiment of the monocular display device according to the present disclosure having a wireless ear bud transducer.

Turning now to FIG. 7, there is shown an alternative embodiment of the monocular display device 700. In this embodiment, the monocular display device 700 plays back audio using a wireless interface, and may include a transmitter and receiver, and includes a wireless ear bud transducer 710 that can wireless communicate with the device 700 for playing back audio to the wearer. In this embodiment, the monocular display device 700 may include a transmitter for sending wireless radio frequency signals to a receiver (not shown) with the receiver being located in or on the ear bud 710. In an alternative embodiment, the ear bud 710 may include a jack that is coupled to an internal battery (not shown) for charging the ear bud transducer 710. The jack may be configured to plug into a port of the device 700.

Figure 8:
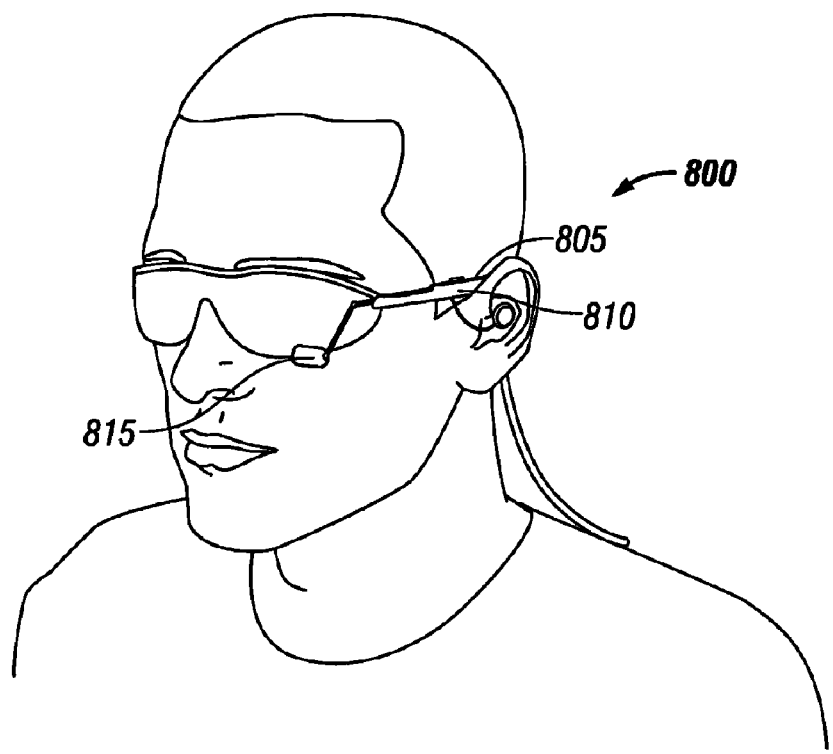
FIGS. 8 through 9 show another embodiment of the monocular display device with a component slot on the body portion of the device and supported by a respective hook and an ear loop.

Turning now to FIG. 8, there is shown another embodiment of a monocular device 800 including a component slot 805. In this embodiment, the component slot 805 is located in a body portion 810 of the device 800; however, the component slot 800 may be located in other areas such as, for example, in a display 815. As mentioned above, the component slot 805 can be configured to receive a previously described component that is lightweight and that adds functionality to the device 800. In one embodiment, the component may be a mini-card, a memory, a GPS device, a Universal Serial Bus ("USB") component, a broadcast TV tuner and or broadcast radio tuner, or similar device that plugs into a component slot 805. Various lightweight functional component configurations are possible and within the scope of the present disclosure, and the device may be removed from a frame using a clip to access the slot.

Figure 9:
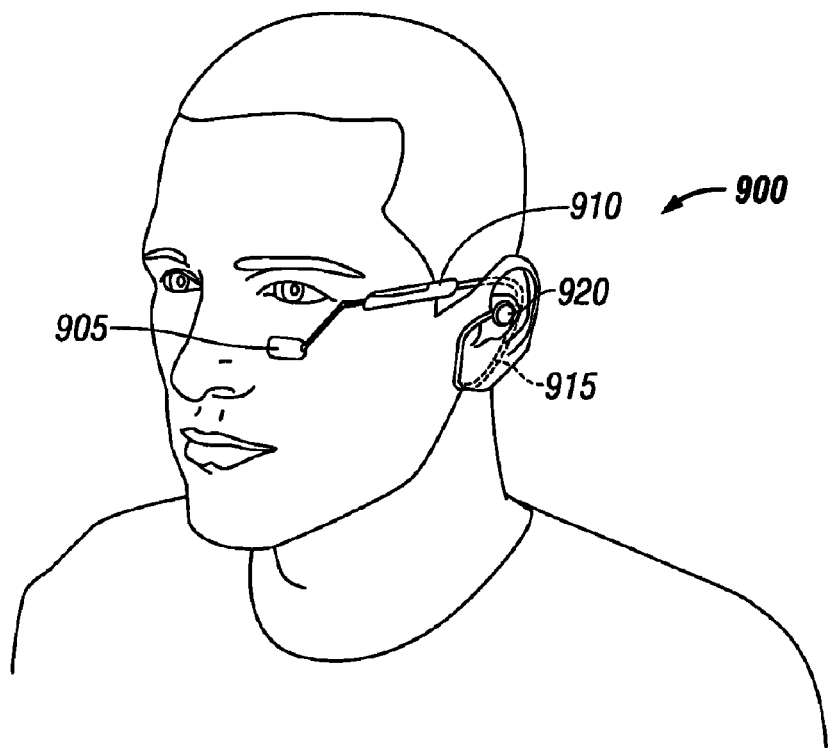

Turning now to FIG. 9, there is shown another embodiment of a monocular device 900 configured to be supported around an ear of the wearer instead of clipped to a frame. In this configuration, the monocular device 900 includes a display 905 and a body portion 910. The body portion 910 includes a distal flexible hook 915 that is adjustable. The flexible hook 915 has a size complementary to the ear and can be, directly connected or supported on the body portion 910 using a swivel, fitting or similar joint. The flexible hook 915 is soft and made of a flexible non-abrasive material. In one embodiment, the hook 915 may have an interior that can be weighted slightly. The hook 915 may be configured to support the display 905 in a fixed and stationary manner, and positioned relative to the user's dominant eye. The device 900 may further include functional components connected to, or in, the hook 915. In this embodiment, disposed at an end of the hook 915 is an ear bud transducer 920 for providing audio output. The transducer 920 may be wired to the device 900 in a manner previously described, or alternatively the hook 915 may include other functional components to evenly distribute the overall weight of the device 900.

Figure 10:
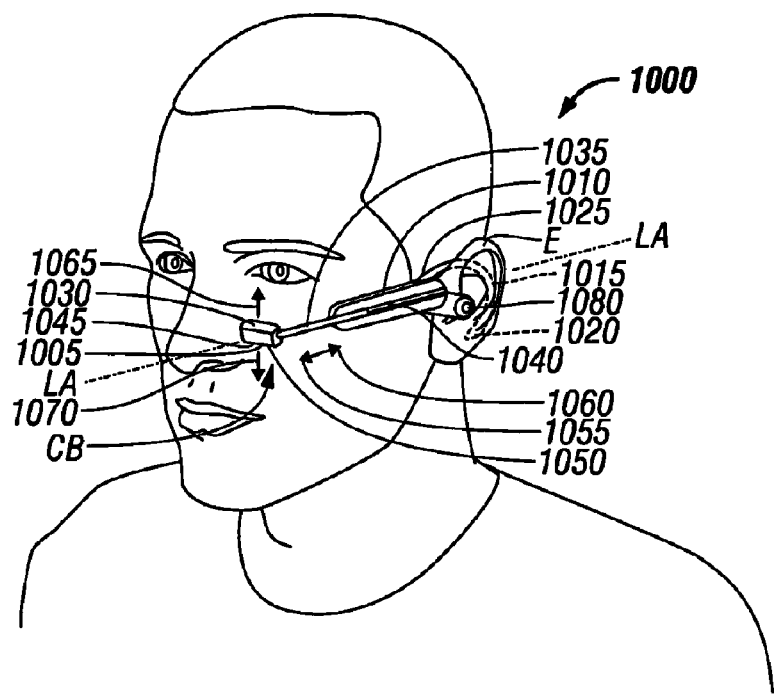
FIG. 10 shows another embodiment of the monocular display device including a support pad for supporting the display element on the cheek of the wearer.

Turning now to FIG. 10, there is shown another alternative embodiment of the monocular device 1000 according to the present disclosure for supporting the monocular device 1000 in multiple locations. The multiple support points provide for a stable displayed image during walking, running, or otherwise moving the monocular display device 1000 during day-to-day use of the device 100, and prevents excessive movement of the display device 1000. As shown, the monocular display device 1000 is primarily supported around an ear E of the wearer, and further includes a secondary support structure 1005 located opposite the ear E for further providing additional support to the monocular device 1000 for stable operation.

In this aspect, the secondary support structure 1005 may be configured to provide for a secondary support point by contacting another surface, such as, for example, a face or another portion of the wearer of the monocular display device 1000. In this aspect, a portion of the monocular display device 1000 may be supported on the face or skin of the wearer, or the body of the wearer, or even supported on a garment that the wearer has on, such as a hat, necklace, baseball cap, shirt, sweater, or similar garment. In one exemplary embodiment of the present device 1000, the monocular display device 1000 is preferably supported on a cheek, or cheek bone (hereinafter "CB") of the wearer. This additional or secondary support point preferably supports a previously cantilevered free end of the device 1000 and provides for a stable displayed image during movement of the device 1000 when the wearer is walking or running, and prevents the free end (that supports a display element 1030) from deflecting or otherwise moving upwardly and downwardly during excessive movement.

As shown in FIG. 10, the monocular display device 1000 of the present embodiment includes a housing 1010 that is connected to an ear loop 1015 that surrounds the ear E of the wearer. Ear loop 1015 is a flexible member and includes a free end 1020 that is opposite a fixed end 1025, which is connected to the housing 1010. In one alternative embodiment of the present disclosure, the ear loop 1015 may include a weighted configuration so that a center of gravity of the entire display device 1000 is closer to the ear loop 1015 rather than closer to the display element 1030. This prevents the device 1000 from deflecting upwardly and downwardly in the location of the display element 1030 during movement of the wearer. It is contemplated that one or more weights or relatively heavier device components may be placed either in the housing 1010 or in the ear loop 1015 to move the center of gravity closer to the ear loop 1015 as opposed to the display element 1030 and as desired.

The monocular display device 1000 further includes that the display element 1030 is connected to the housing 1010 by a telescoping support arm 1035. The telescoping support arm 1035 rides in a channel 1040 that located on a lateral side of the housing 1010. The telescoping support arm 1035 preferably can retract, to bring the display element 1030 closely adjacent to the housing 1010, or alternatively the telescoping support arm 1035 can fully extend relative to the housing 1010 for viewing images on the display element 1030. The telescoping support arm 1035 can be moved for stowing the display 1030 adjacent to the housing, or for moving the display element 1030 in the viewing position by simply grasping the display element 1030 and pulling the display element 1030 or pushing the display element 1030 using the wearer's hand in the direction of reference arrows 1055 and 1060 without dislodging the device 1000 from the head. It should be appreciated that automatic extension and retraction is also contemplated using a switched reluctance motor, or similar electric device. Moreover, the telescoping support arm 1035 can be easily moved back and forth between stowing the display element 1030 adjacent to the housing 1010, and moving the display element 1030 to the viewing position without accidentally disengaging the ear loop 1015 of the display device 1000 from the ear E.

In this embodiment, the bottom side 1045 of the display element 1030 preferably includes a support surface or pad 1050 fixedly connected to the bottom side 1045 of the display element 1030. The support pad 1050 is configured to permit the display element 1030 to rest on the cheek bone CB of the wearer in a comfortable manner, while simultaneously providing additional support to the monocular display device 1000. In one embodiment, the support pad 1050 is preferably a cushion, or a resilient member having a smooth surface that is free of irregularities. In one embodiment, the support pad 1050 may be a silicone pad, or similar structure that is disposed on a bottom side 1045 of the display element 1030. Pad 1050 may surround the display element 1030 in a framed manner or can be otherwise disposed between the display element 1030 and the skin of the wearer. The support pad 1050 can have complementary dimensions to the display element 1030 or can be smaller than the display element 1030 to provide for a cushioned support. Pad 1050 is preferably very lightweight. The diminutive weight of pad 1050 prevents otherwise disturbing the orientation of the ear loop 1015 and/or inadvertently disengaging the ear loop 1015 from the ear E.

In another embodiment, the support pad 1050 may have a configuration to adhere slightly to the skin of the wearer to further provide support at the cheek bone CB of the wearer. Support pad 1050 may be smooth and, not only provide a frictional engagement, but also may adhere to the skin of the wearer. Pad 1050 can be easily attached and detached from the user's skin with ease, and without harming the skin, or pulling at the skin. Pad 1050 is removed/attached using little pressure to remove/attach the device 1000 from the wearer.

The telescoping support arm 1035 further is configured to articulate upwardly and downwardly relative to a longitudinal axis LA that is disposed through the device 1000 as shown in FIG. 10. In this manner, the telescoping support arm 1035 may include an additional joint (not shown) for articulating in the manner shown by reference arrows 1065, and 1070.

In this manner, if the wearer is stationary, or sitting, the wearer may have the display element 1030 elevated as shown previously in FIG. 10 or disposed in the viewing position. However, if the wearer decides or walk, run, or engage in exercise, the viewer can articulate the display element 1030 in a position downwardly in the direction of arrow 1070 relative to the longitudinal axis LA. This moves the display element 1030 so that the support pad 1050, on the display element 1030, contacts the wearer's skin, the cheekbone CB, or the cheek of the wearer. In one embodiment, the pad 1050 can be removable and replaceable with a fresh pad 1050. The detachable pad 1050 may be removed for cleaning or for replacement and ensures that only a fresh and clean pad 1050 contacts the user's face, during use.

In an alternative embodiment, the support pad 1050 may also rest on, and even adhere to, the skin, and be fixedly supported thereon. In this manner, the wearer can run, walk, bike, or otherwise exercise in order to conduct the wearer's normal activities while the image, displayed on the display element 1030, does not move up and down during movement of the wearer. The support allows for the display element 1030 to instead remain stable and in a substantially fixed location so the wearer can peer down and view images on the display element 1030, which is adhered on a fixed location on the cheek bone CB, or on the skin near the cheek. At the conclusion of the traveling, or exercise, and when the wearer is once again sitting, or otherwise stationary, the wearer may grasp the display element 1030 and "un-stick" the support pad 1050 from the wearer's skin, and then articulate the telescoping support arm 1035 to the viewing position in one motion. At this location, the wearer can once again view the images with the display element 1030 in the elevated position and separated from the cheek bone CB, or skin. It should be appreciated that in each of the embodiments, the display element 1030 is outside of the viewer's normal peripheral vision, and does not occlude the viewer's normal peripheral vision.

The monocular display device 1000 further includes an ear bud 1080. The ear bud 1080, preferably includes a speaker system for playing back audio and may be retained in the ear during playback of audio. Ear bud 1080 is connected to a DSP processor, or similar analog circuit and may also be rotated to another position, or inside the housing 1010 for storage. It is contemplated that the ear bud 1080 also provides an additional support point for the monocular display device 1000 during use, and it assists with retaining the device 1000 in position.

Figure 11:
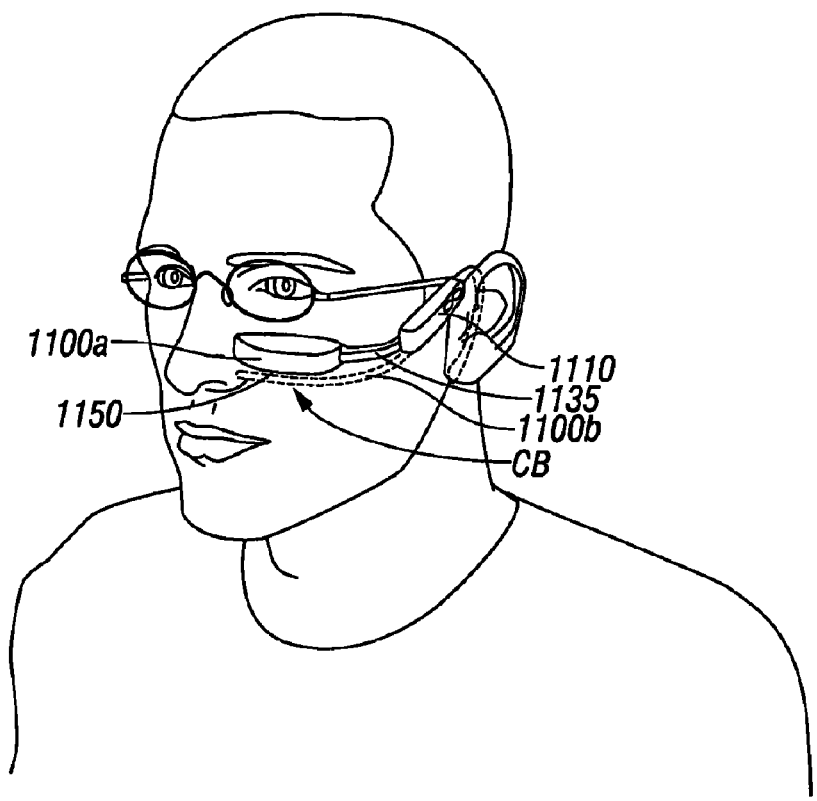
FIG. 11 shows two views of the monocular display device of FIG. 10 in a first elevated configuration and a second configuration resting on the cheek of the wearer.

Turning now to FIG. 11, there is shown, a perspective view of the monocular display device 1100 in a first elevated configuration shown as reference numeral 1100*a* and in a second configuration 1100*b* or lowered, and contacting an additional support surface, on the cheek of the wearer. In the second configuration 1100*b* of the display device 1100, the support pad 1150 contacts and adheres to the cheekbone CB of the wearer. Here, the wearer can jump, bike, walk, or otherwise move and the monocular display device 1100*b* can rest in a supported and sturdy manner for viewing images. In this embodiment, the monocular display device 1100 does not includes a telescoping support arm 1135 extending in a channel, as shown in FIG. 10 and instead is made with an articulating support arm 1135 that extends through the housing 1110. It should be appreciated that the viewer can view images on the display element 1130 in either configurations 1100*a*, 1100*b* without occluding the viewer's normal viewing space.

Figure 12:
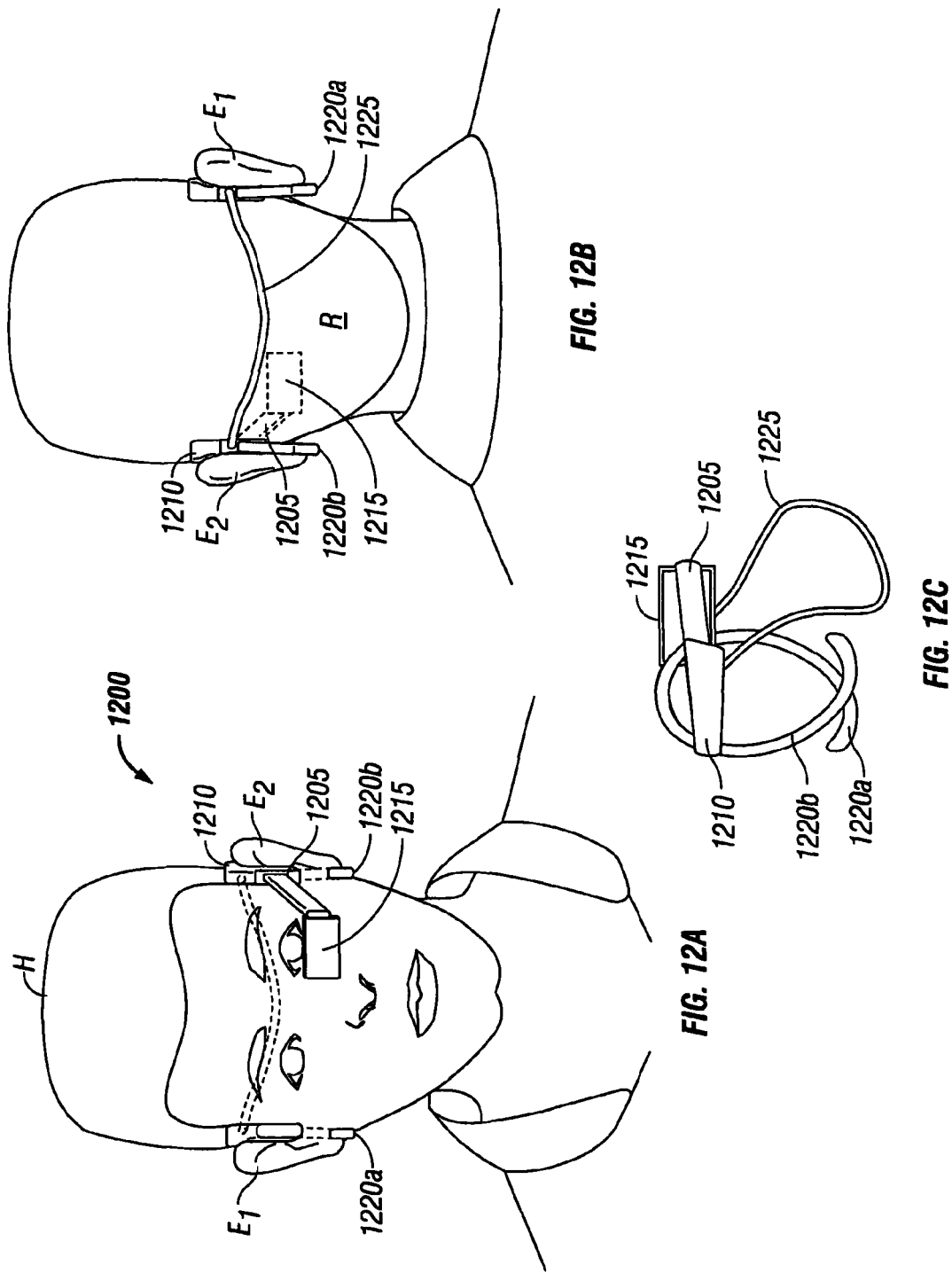
FIGS. 12A and 12B show a configuration of a head mounted display with a pair of ear loops.
FIG. 12C shows the display in a folded configuration.

Turning now to FIG. 12A and FIG. 12B, there is shown yet another embodiment of the monocular display device 1200. FIGS. 12A-12B show respective front and rear views of the monocular display device 1200 being supported on the head H of a wearer with a different stable support structure relative to the previously described embodiment. In this embodiment as shown, the monocular display device 1200 includes a housing 1205 with a stable support structure 1210 that evenly distributes the weight of the device 1200.

The support structure 1210 preferably supports the display 1215 in a comfortable manner on the user's head H. Preferably, the support structure 1210 is advantageously configured. In this embodiment, the viewer can comfortably view images with the display 1215, and user can view the display 1215 during excessive motion, such as, for example, running or walking. During motion, the display 1215 will preferably be maintained in a comfortable position in the peripheral viewing space of the user, and will not traverse upwardly, and downwardly, or excessively shake during movement.

In this embodiment, the support structure 1210 preferably supports the housing 1205 around both of the user's ears E1, E2 and around the rear R of the user's head H. In this embodiment, the support structure 1210 includes a first ear loop 1220*a* and a second ear loop 1220*b*. Loops 1220*a*, 1220*b* are connected to one another by a resilient band member 1225 (as shown in FIG. 12B). The first ear loop 1220*a* and the second ear loop 1220*b* are each curved resilient members that are each made of a lightweight material. First ear loop 1220*a* and second ear loop 1220*b* can be made from a thermoplastic, and preferably each includes a comfortable, cushioned material or surface, which engages the ears E1, and E2. First ear loop 1220*a* engages the housing 1205 at an end and is connected to the second ear loop 1220*b* by the elongated band member 1225. The band member 1225 may be connected to each of the ear loops 1220*a* and 1220*b* by a connector, or even be made as an integral band member therewith. Likewise, the band member 1225 is made from a lightweight material, such as, a thermoplastic, aluminum, titanium, or a nickel titanium alloy, and is diminutive, and does not excessively weigh down device 1200. Band member 1225 can be hollow, and may include a cushioned surface or material for engaging with the rear of the viewer's head H, as shown.

The band member 1225 is slightly curved to match the curvature of the head H as shown in FIG. 12B. Preferably, the band member 1225 extends radially around the rear R of the head H, or only a portion of the head. When worn, the band member 1225 rests in a comfortable manner in the rear "R" as shown in FIG. 12B; however, when removed, it is envisioned that the band member 1225 can telescope or fold so as to be suitably sized to fit in a pocket of the wearer for transport as shown in FIG. 12C.

In one non-limiting embodiment, the monocular device 1200 may be supported in multiple locations. In one embodiment, the multiple locations may include at least three locations. Firstly, the display 1215 (FIG. 12A) may includes a nose bridge support (not shown) that gently rests on the nose of the wearer, similar to a pair of eyeglasses. The nose bridge support (not shown) may extend from the display 1215. Secondly, the display 1215 may include an ear loop 1220*a* or similar device for supporting the body 1205 of the device 1200 around the ear of the wearer W. Thirdly, the device 1200 may also include a band member 1225. The band member 1225 (FIG. 12B) may alternatively extend all of the way around the rear of the head of the wearer W, half way around the head, three quarters around the rear of the head, or one-quarter around. Preferably, the bar 1225 extends around the cranium of the wearer W in the rear about where the occipital bone of the skull is located.

The device 1200 may tend to pull off of the face of the wearer W when the wearer W adjusts the display 1215, however using a three or more point support system, the device 1200 will comfortably rest on the user's head and will resist the tendency to tilt off the vertical axis. Preferably, the band member 1225, the ear loop 1220*a* or 1220*b* and optionally the nose bridge (not shown) form substantially a conformal C-clamp relative to the wearer W. This allows for a stable support even when the wearer moves in his or her daily activities.

As mentioned, the monocular display device 1200 provides images to the viewer, and the monocular display device 1200 further includes the display 1215, which can be any lightweight display as previously discussed. Display 1215 is connected to the support structure 1210 in a cantilever fashion with the display 1215 free at a distal end opposite loops 1220*a*, 1220*b*. Display 1215 extends in a frontal/side portion of the viewer's face so the viewer may view images from the display device 1215 in a comfortable and easy manner, without blocking the area in the front of the viewers eyes. The display 1215 is only positioned in the peripheral viewing space of the viewer, as previously described.

First and second ear loops 1220*a*, and 1220*b*, advantageously, distribute the entire total weight of the monocular display device 1200 over a greater area around the wearer's head H, instead of in one location or point. This weight, which can be several ounces or more, is distributed in a substantially even and uniform manner around the user's head H. This distribution of the weight allows the device 1200 to feel lightweight, when worn. The user can carry the multifunctional device 1200 in an easy and unobtrusive manner due to the lightweight feel of the device 1200. In one embodiment, the support structure 1210 may include only one ear loop 1220*a*, as previously discussed, instead of two ear loops 1220*a*, 1220*b* as shown in FIGS. 12A and 12B, but the monocular display device 1200 is not limited to this specific configuration. Ear loops 1220*a* and 1220*b* preferably are cushioned, or made from a smooth non-abrasive material to be comfortably worn by the wearer.

Figure 13:
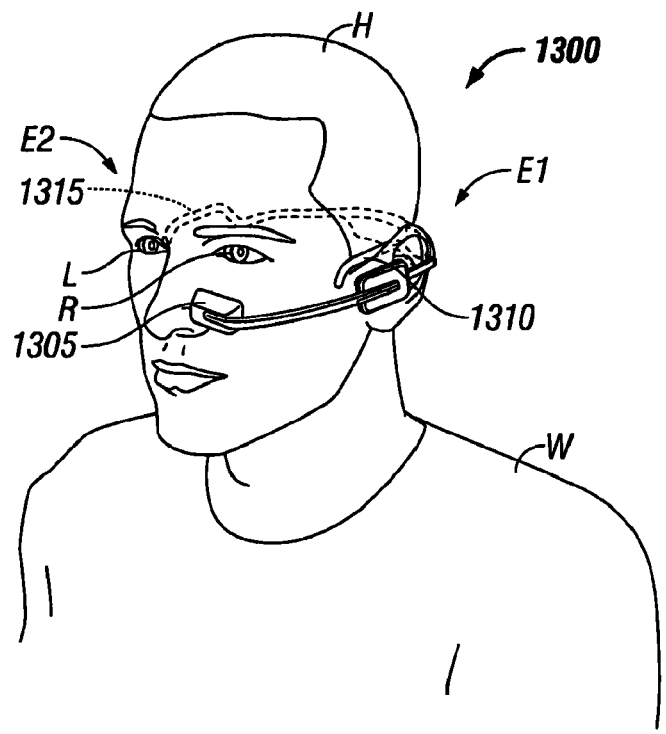
FIGS. 13 through 18 shows a reversible monocular display device that can interchangeably be worn on either the left side or the right side of the wearer's head.

FIG. 13 shows another embodiment according to the present disclosure of a support structure for a monocular display device 1300. The present monocular display device 1300 preferably can be manufactured to avoid making one "right handed device" for some users and making one "left handed device" for other users. Preferably manufacturers, retailers, and individuals would not desire to sell multiple different left or right handed device models, and instead would desire a single monocular device 1300 that is adjustable, and will easily accommodate multiple users without completely taking the device apart or other substantial major modification.

In this embodiment, the monocular display device 1300 can be advantageously manufactured as one unit that can be convertible from one head support configuration to another support configuration. Between the two or more support configurations, the device 1300 will include a display 1305, and the display 1305 will easily and quickly be oriented in the correct position or in a position that does not occlude the wearer's normal viewing space. Instead, the wearer can share the device 1300 with others and easily move the device 1300 from one orientation to the next without a major modification to the device 1300 (to orient the display 1305 in the peripheral vision of the wearer on the right or left hand side). Thus, the wearer W can enjoy the device 1300 in day-to-day activities without complete occlusion of the user's vision.

It is understood that some users have a dominant left eye L, and other user's have a dominant right eye R. This so called "ocular dominance" or "eyedness" is the tendency of the brain of receiving visual input from one eye over the other. Some users W prefer receiving visual input from a display from the left eye L, while others prefer receiving visual input from the display 4605 from the right eye R. Put simply, even though users can correctly see from both eyes, users prefer one eye over the other.

It should be appreciated that some users W may desire that the monocular display 1300 be positioned spaced from the left eye L (as oriented when directly facing the wearer). It should also be appreciated that some other users W may desire that the monocular display 1300 be positioned spaced from the opposite side or the right eye R (when oriented looking directly at the wearer W). Users W would also tend to not use the device 1300 (or use the device 1300 less) if the device 1300 is incorrectly oriented in front of the "wrong" eye. The present monocular display device 1300 preferably can be configured so the device 1300 is "reversible" or is easily changeable from orienting the display 1305 from the right eye R to the left eye L and vice versa so one device 1300 will accommodate multiple users.

Figure 14:
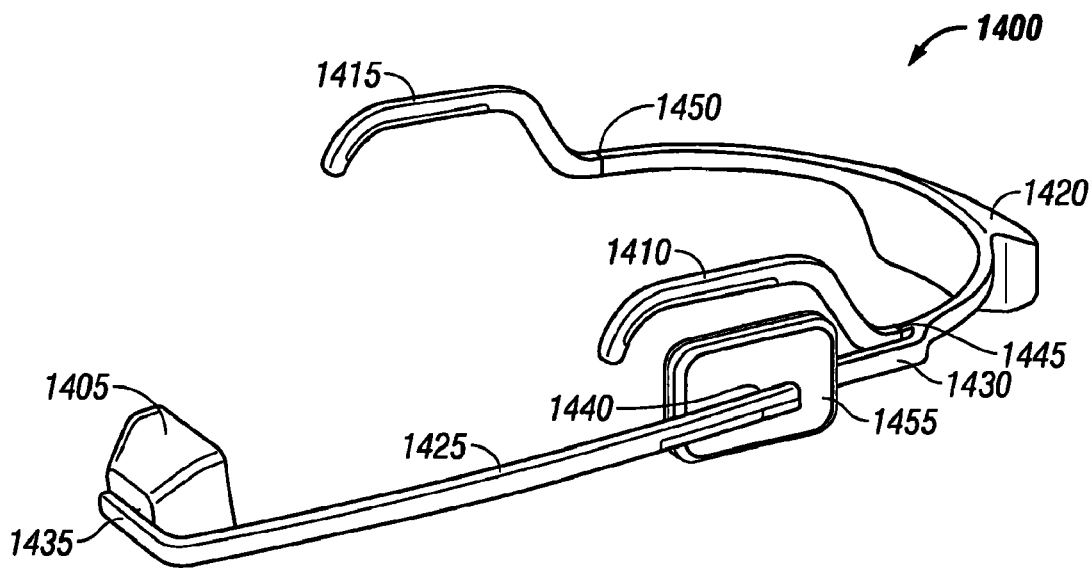

There is shown in FIG. 13 one embodiment of the "reversible" monocular display device 1300 that is supported on a head H of the wearer W. Several preferred embodiments are shown. Turning to FIG. 14, the monocular display device 1400 preferably includes a first ear loop 1410, and a second ear loop 1415 for supporting the device 1400 on the head H of the wearer W, and with the loops 1415, 1410 over both ears E1, E2 of the wearer W. The first ear loop 1410 and the second ear loop 1415 are generally slightly curved bar like members, and have a bend and can have a "user bendable" feature to fit in a comfortable manner. Various other ear support shapes and members are envisioned, and the present disclosure is not limited to any ear looped shape or any other specific bar.

The first ear loop 1410 and the second ear loop 1415 are connected to a rear support member 1420. The rear support member 1420 generally extends around the rear R of the wearer's head H, and preferably may include a hollow interior for storing one or more electronic components, interconnect wiring or interconnect optical cabling of the monocular display device 1400. Interior may be for storing a battery (not shown) or other items useful with the monocular display or to expand the functionality of the device 1400. Preferably, the rear support member 1420 includes a band-like member shaped portion. This portion 1420 is for comfortably supporting the device 1400 in the rear R of the wearer's head H.

The monocular display device 1400 also includes an elongated support member 1425 that extends in a front of the wearer W, and that is connected structurally and electronically to the rear support member 1420 by a structural member and an embedded multi-pronged connection point 1430. The support member 1425 is preferably a cantilevered support member with a curved end 1435. The monocular display 1405 is connected to the cantilevered support member 1425 at the curved end 1435. Preferably, the support member 1425 is hollow and includes a conductive wire (not shown) to facilitate a connection between the display 1405 and the interior electronic components of the device 1400, such as a bus, and a controller, etc. which can be stored in the interior space of the device 1400.

Preferably, the device 1400 includes a number of pivot connections at 1435, 1440, 1445, and 1450 to manipulate the orientation of the support components of the device 1400. Various numbers of pivot connection can be used, and the present disclosure is not limited to any specific number of pivot connections. The optical and microphone pod that houses the display 1405 is preferably connected to support member 1425 by a pivot or ball joint, and the first ear loop 1410 is preferably connected to the rear support member 1420 by a first pivot 1445 such that the first ear loop 1410 may be rotated about one hundred eighty degrees or more relative to an orientation of the rear support member 1420.

On the opposite side, the second ear loop 1415 is also preferably connected to the rear support band member 1420 by a second pivot 1450. The second ear loop 1415 may be rotated about one hundred eighty degrees or more relative to an orientation of the rear support member 1420. The support member 1425 that supports the display 1405 is also preferably connected to the rear support member 1420 at the pronged connection 1430 by a third pivot 1440. The support member 1425 may rotate relative to the third pivot 1440 to deflect the display 1405 upwardly and downwardly about forty five degrees or more relative to an orientation of the rear support member 1420. This permits an adjustment of the orientation and the position of the display 1405 relative to wearer's W eye.

The elongated, cantilevered support member 1425 also is connected to a support plate 1455, which is connected to the pronged connection 1430. The support member 1425 may further include a telescoping portion (not shown) to move the support member 1425 in a direction toward or away from the support plate 1455 for further adjustment of the display's 1405 position relative to the wearer W in a longitudinal manner. The support plate 1455 may also house one or more electronic components of the device 1400, such as a bus, or transceiver, etc.

Figure 15:
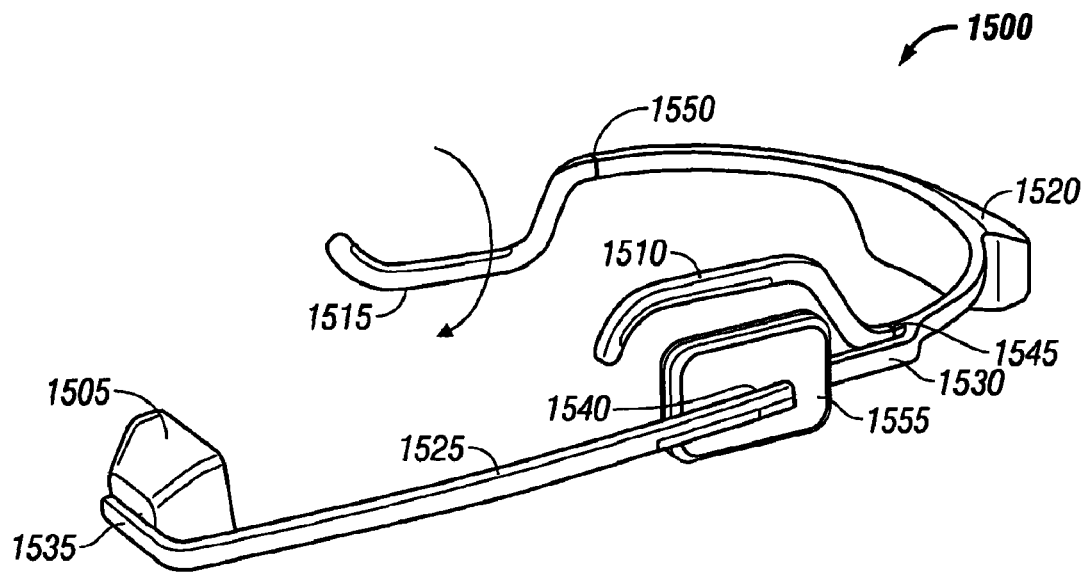

Turning now to FIG. 15, in operation, the wearer W can easily convert the right handed oriented device where the display 1500 is located on the right hand side R of the wearer W (while looking at the wearer from the front) to a left handed oriented device L. This is where the display 1505 is on the opposite side, and where the display 1505 is located on the left hand side L of the wearer W. In this regard, the user W can change the device 1500 to share the device 1500 with multiple users, by easily converting the device 1500 from between one side or another with ease.

Figure 16:
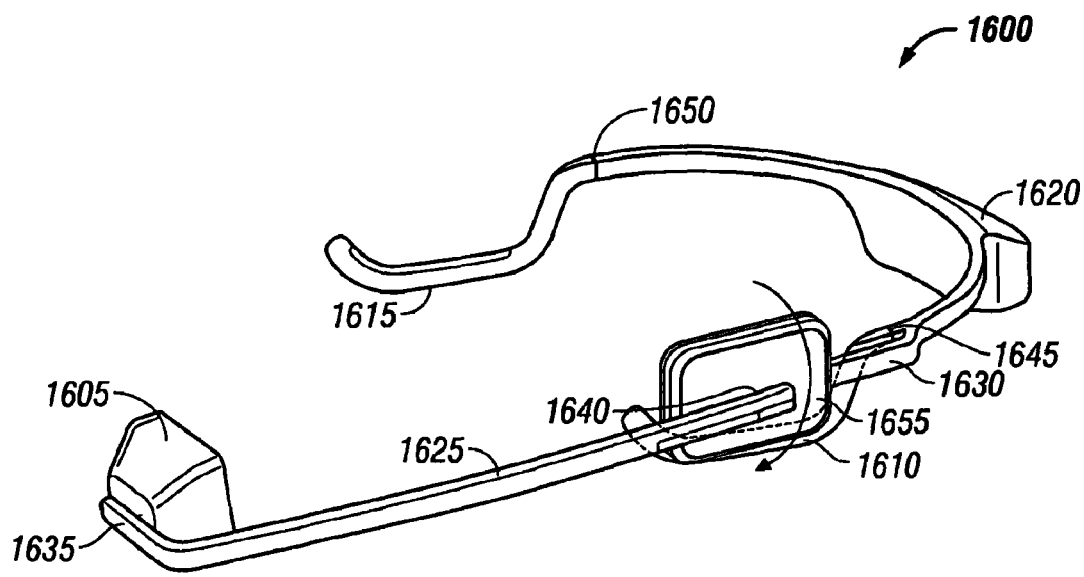

First as shown in FIG. 15, the user W will rotate the second ear loop 1515 about 180 degrees. Second, as shown in FIG. 16, the user will grasp the first ear loop 1610 to convert the device 1600, and will rotate the first ear loop 1610 about 180 degrees. In this manner, turning to FIG. 17, the user W will then rotate and invert the entire device 1700 about 180 degrees. In FIG. 13, the respective right ear loop 1315 and the left ear loop 1310, now become in FIG. 18, the respective left ear loop 1815 and the right ear loop 1810. In the inverted position shown in FIG. 18, the monocular display 1805 is now located on an opposite side of the wearer's W face. Thus, the device 1800 is then placed on the head H and worn on the head of the wearer W in the inverted manner (FIG. 18).

Figure 17:
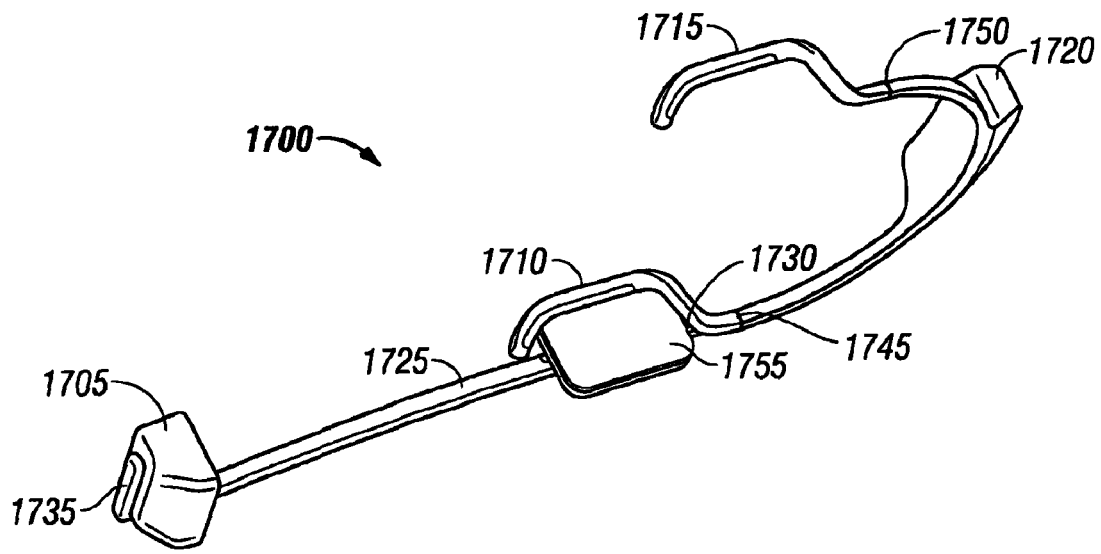

It should be appreciated that in FIG. 17, the first ear loop 1710, and the second ear loop 1715 and the rear support member 1720 are cushioned or substantially covered with a comfortable material that is smooth and non-abrasive so the monocular display device 1700 is comfortable, when worn. Preferably, the display 1705 may also be connected to the support member 1725 using a ball-swivel connection so the display 1705 can be selectively moved relative to the support member 1725 for further adjustment when the device 1700 is worn.

Figure 18:
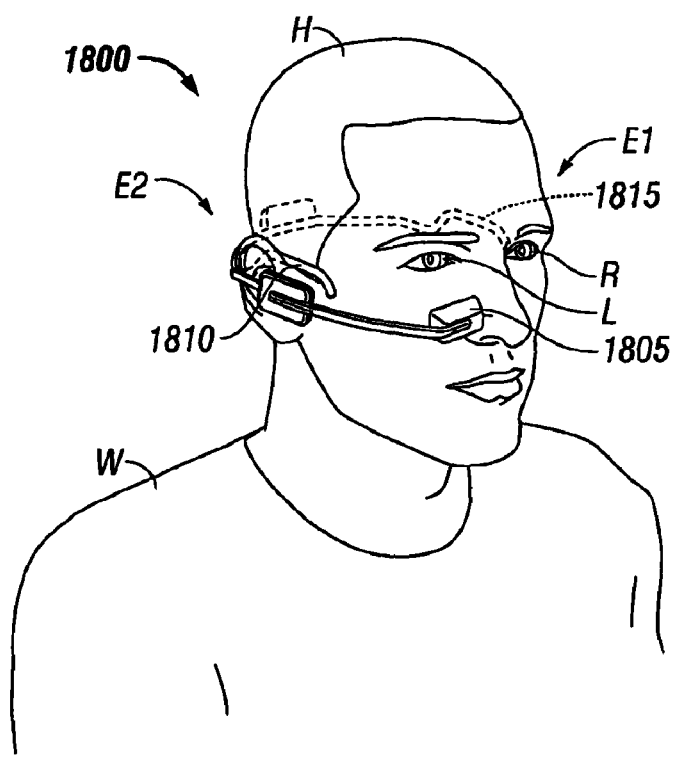
Figure 19:
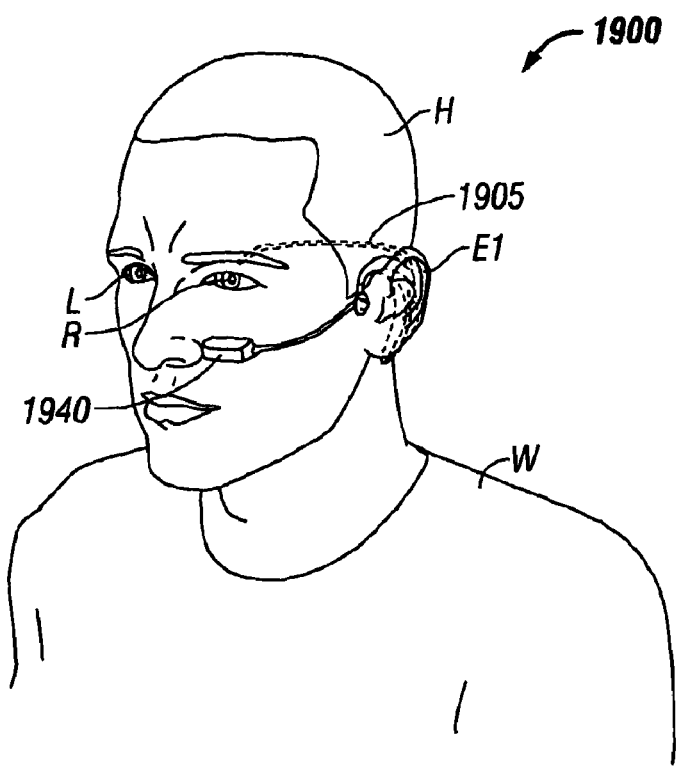
FIGS. 19 through 22 shows yet another embodiment of a reversible monocular display device.
Figure 20:
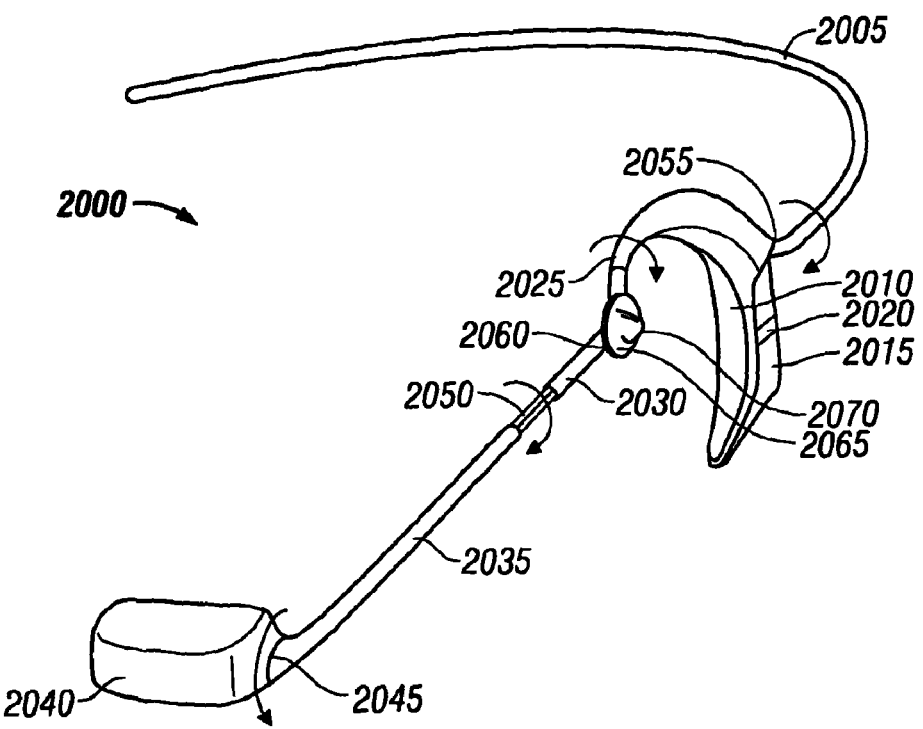

Turning now to FIG. 19, there is shown an alternative embodiment of the present disclosure. In this embodiment, the device 1900 includes a rear support member 1905 that does not extend around the entire rear R of the wearer's head H, and instead only extends about partway across (or extends less than the entire rear of the wearer's head H). Turning to FIG. 20, in this embodiment, device 2000 preferably has a single ear loop 2010. The ear loop 2010 supports the entire weight of the device 2000 around a single ear E1 of the wearer W (FIG. 19) relative to an embodiment that has multiple ear loops (FIG. 18). The ear loop 2010 also includes a rear housing 2015. The rear housing 2015 also is hollow and includes an electronic component of the device 2000, such as a bus, or transceiver for wireless connection to a remote device. An exterior surface of the rear housing 2015 preferably may include one or more buttons 2020 operatively connected to electronic components to the device 2000, and to assist with operation of the device 2000.

The device 2000 also includes a rear support band member 2005 that is a lightweight elongated, and curved member, and is preferably disposed in a lower location relative to the embodiment of FIG. 18. In this embodiment, the rear member 2005 is supported in a lower, snug location relative to the previously described embodiments. Rear support member 2005 is preferably disposed in a location generally associated with an occipital bone of the wearer's skull. This location preferably assists with supporting the device 2000, as the device 2000 will comfortably and stably wrap around the lower rear or back of the wearer's head H.

The ear loop 2010 has a proximal section 2025 that is connected to an intermediate member 2030 or bar. The intermediate member 2030 is an elongated bar-like member made from a light weight material that is connected to a support member 2035, which is connected to the display 2040. Again, this embodiment of the device 2000 includes a number of pivot or rotation points 2045, 2050, and 2055 in order to convert the monocular display device 2000 from a "right handed" orientation to a "left handed" orientation.

Preferably in a proximal section of the device 2000, the monocular display 2000 is connected to the support member 2035 by a first pivot 2045. The intermediate member 2030 is also connected to the cantilever support member 2035 by a second pivot 2050, and the rear member 2005 is connected to the ear loop 2020 by a third pivot 2055. The intermediate member 2030 is also connected to the ear loop 2010 by a fourth pivot 2060.

The monocular display device 2000 preferably can be rotated slightly at the first pivot 2045. This is for an adjustment of the viewing angle during display 2040 use using the first pivot 5345. In this embodiment, the user can slightly adjust the viewing angle by rotating display device 2040 itself about ten to about thirty degrees.

To convert the device 2000 so it can be worn around the opposite ear of the wearer, the device 2000 is removed from the head H, and the rear support member 2005 is rotated about 180 degrees from the third pivot point 2055. Next, the intermediate member 2030 connected to the monocular display 2040 is rotated about 180 degrees at the third pivot point 2050 to correctly orient the monocular display 2040 on the opposite side in either of the directions shown in FIG. 20 clockwise or counter clockwise.

Figure 21:
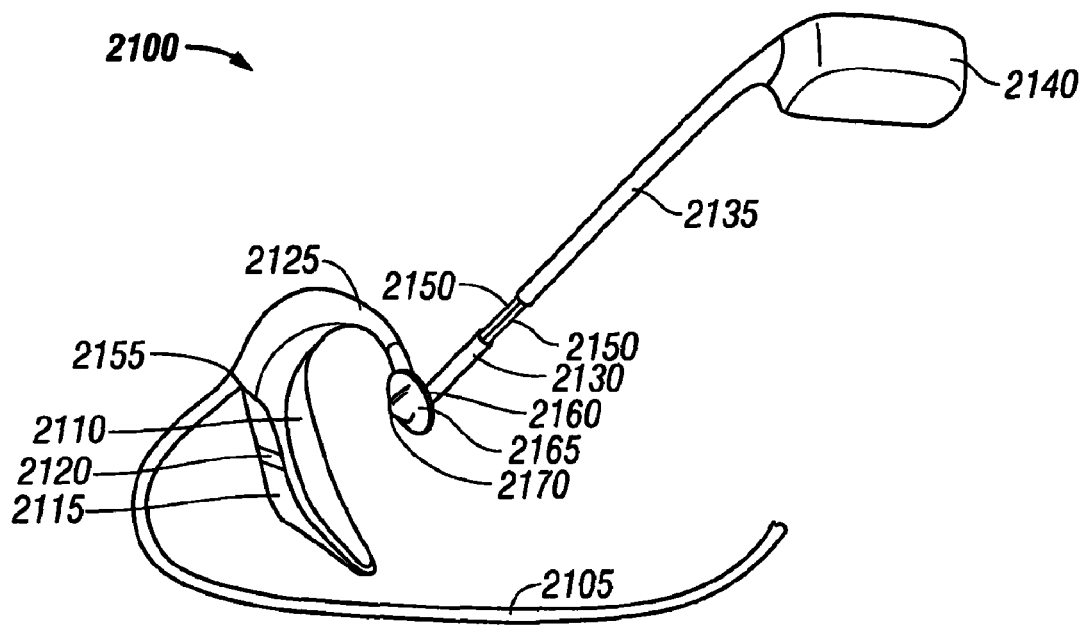
Figure 22:
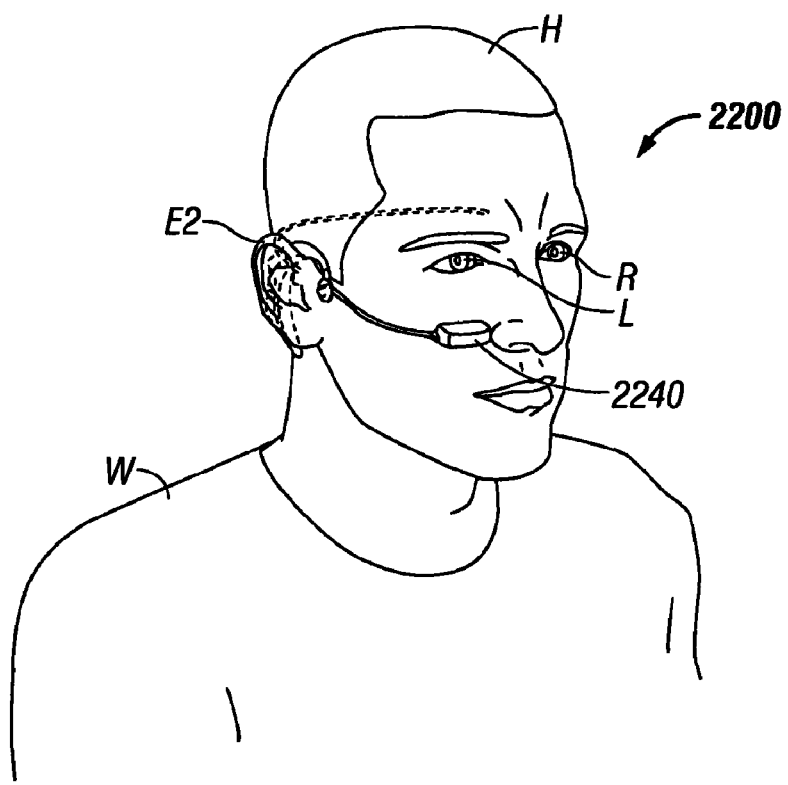

Finally turning to FIG. 21, the ear loop 2110 is supported over the opposite ear so the rear support member 2105 rests on the back or rear R of the wearer's W head H or in a position generally associated with an occipital bone of the wearer's skull, and the display 2240 is correctly in the front of the opposite eye of the wearer W as shown in FIG. 22. In this manner, the wearer W can wear the device 2200 on either side of the wearer's head with ease.

Preferably, as shown in FIG. 21, the intermediate member 2130 includes a bulbous or enlarged portion 2165 and preferably the bulbous or enlarged portion 2165 is connected to the ear loop 2110 and includes an aperture 2170 or sound port. This generally aligns near the wearer's ear E2 shown in FIGS. 21-22. Preferably, a speaker or audio transducer (not shown) is located inside the bulbous or enlarged portion 2165 for permitting sound to be emitted in a location that is close or near the wearer's ear E2. This "near ear location" is not located in the ear canal, so the user is free to hear other ambient sounds or noise, without becoming completely immersed in listening to the audio from the monocular device 2100.

Preferably, the ear loop 2110 is cushioned and has a lightweight cushioned portion connected thereto, and is comfortable when worn. Likewise, the rear support member 2105 is lightweight and also may include a similar cushioning to wear the head mounted device 2100 for a period of time.

Preferably the fourth pivot point 2160 that is located between the intermediate support member 2130 and the ear loop 2110 may further include a rotation pivot point for adjustment purposes. This permits the user W to selectively rotate the display 2140 away from the wearer's face so as to not occlude the wearer W completely with the display 2140. This slightly offset location permits the user W to view images emanating from the display 2140 in the normal peripheral vision of the wearer W, and without blocking the user's W normal viewing space as mentioned.

Figure 23:
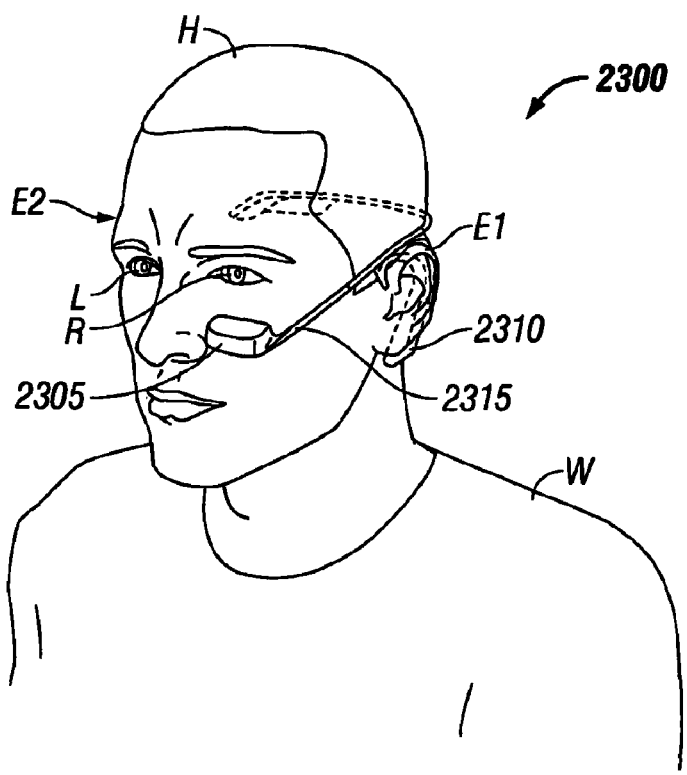
FIGS. 23 through 28 shows a further embodiment of the reversible monocular display device.
Figure 24:
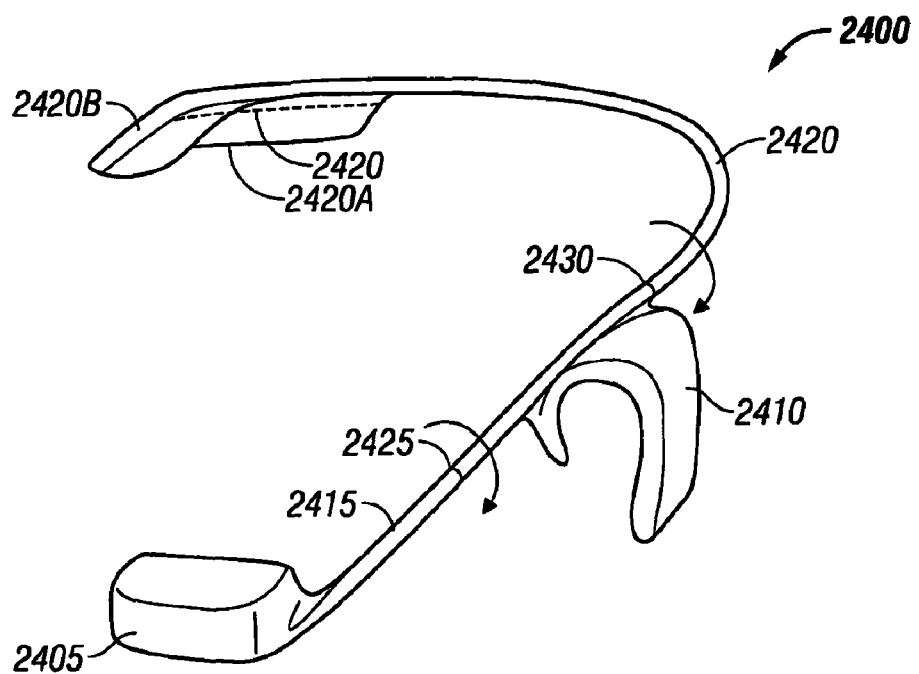

Turning now to FIG. 23-24, there is shown an additional embodiment of the present disclosure. In this embodiment of the present disclosure, the monocular display device 2300 includes a display 2305 connected to an ear loop 2310 by a support member 2315. Turning now to FIG. 24, the monocular display device 2400 also includes a rear support member 2420 that is curved and extends partially around the user's head H in a location that is generally near the occipital bone of the wearer's cranium. On an opposite side relative to the display 2405, the device 2400 includes a cushioned ear support 2420A that is contacts the ear E2 of the wearer W.

The device 2400 preferably includes two swivel or pivot points, or a first pivot 2425 being located between the support member 2415 and the ear loop 2410, and a second pivot point 2430 that is located between the ear loop 2410 at the rear side, and the rear support member 2420. To convert the device 2400 so it can be worn around the opposite ear E2 of the wearer W, the device 2400 is removed from the head and reconfigured for use by the wearer W in front of the right eye.

Figure 25:
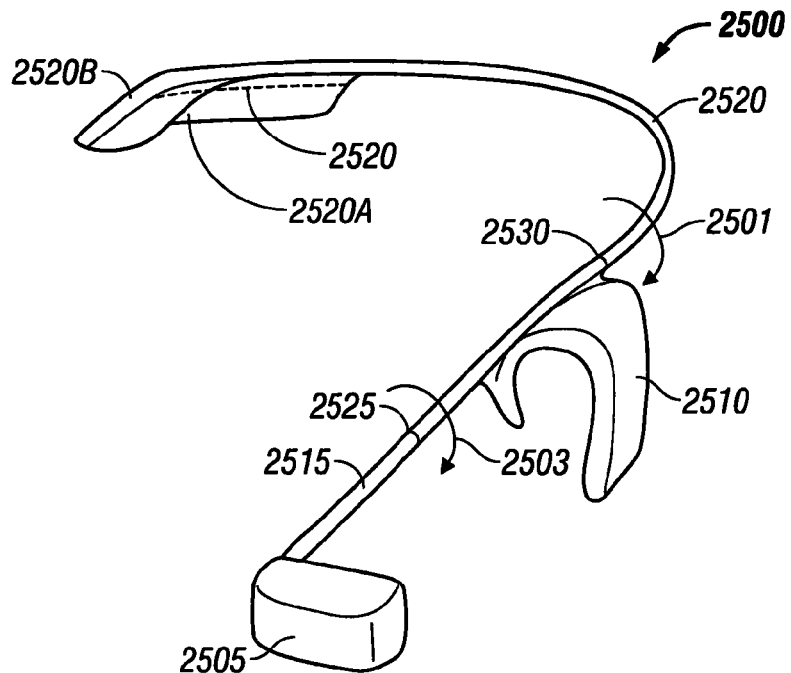
Figure 26:
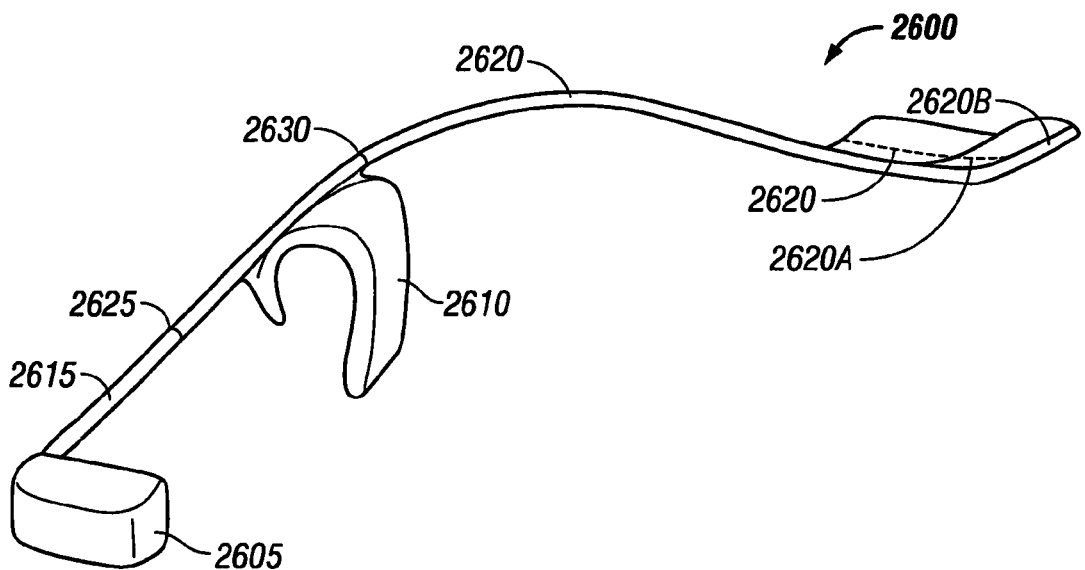
Figure 27:
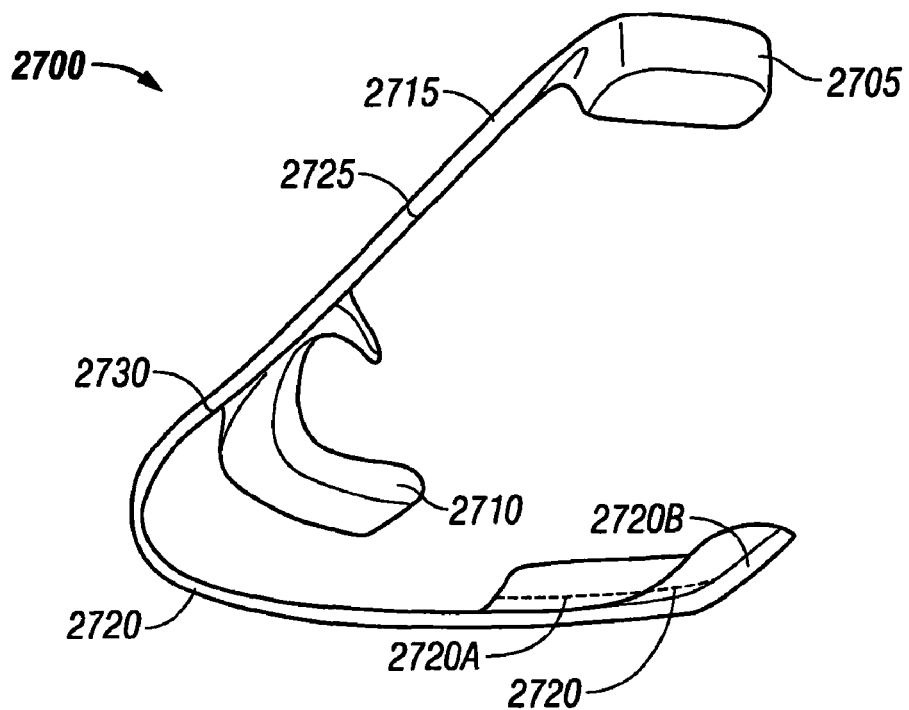
Figure 28:
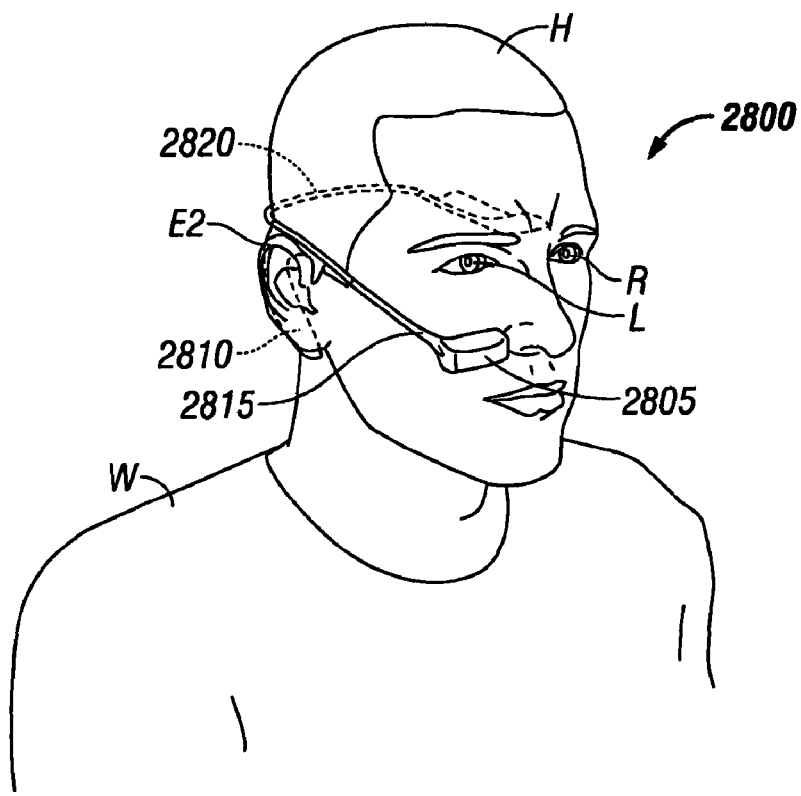

Next as shown in FIG. 25, the rear support member 2520 is rotated generally about 180 degrees or more relative to the second pivot point 2530 in the direction of arrow 2501. Next, the support member 2515, which is connected to the monocular display 2505 is rotated about 180 degrees relative to the first pivot point 2525 in the direction of arrow 2503. This correctly orients the monocular display 2505 for the opposite eye as shown in FIG. 25-26. Finally, turning to FIGS. 27 and 28, the ear loop 2710 is placed on the opposite ear E2 with the rear support member 2720 being gently placed to rest in contact with the back or in the rear R of the wearer W or generally near the occipital bone of the wearer's skull. In this manner, the display 2805 is correctly in the front of the opposite eye L of the wearer W as shown in FIG. 28. In this manner, the wearer W can selectively wear the device 2800 on either side of the wearer's W head H. In the embodiment shown, it should be appreciated there is no pivot being located between the display 2805 and the support member 2815, however, it is envisioned that an additional pivot point (not shown) can be provided at this location to further provide an adjustment to the display 2805 when worn.

Additionally shown in FIG. 24, the cushioned head support 2420A preferably has a notable geometry. Support 2420A has a generally symmetrical shape so the support can be interchangeably placed behind either ear when inverted.

In yet another alternative embodiment, the cushioned ear support 2420A may also be provided with a pivot (not shown) for inverting the cushioned ear support 2420A. As seen in FIG. 27, the cushioned ear support 2720A preferably includes a notched portion 2720 on both sides for which to receive a top of the wearer's ear. An exterior surface of the notched portion 2720 preferably gently rests on a top of the ear in a comfortable and non-abrasive manner regardless of whether the notch 2720 is inverted or not. The opposite side of the cushioned ear support, preferably also includes a similar complementary notch 2720B.

Further, it should be appreciated that both the ear loop 2710, and the cushioned member 2720 may be made as hollow members for housing an interior electronic component. Components may include, such as additional memory components, a bus, a controller, a transceiver, or any other functional electronic component or electronic peripheral device that is desired, or can be coupled to the display, or wirelessly connected to a remote computer. A wireless transceiver may be, for example, placed therein for communication with a wireless head set.

In one embodiment, a circuit board is preferably stored in the cushioned ear loop 2710, and communicates with a powered battery (not shown), which is similarly located in the interior space. Various housing configurations are possible and within the scope of the present disclosure, and various electronic configurations are possible.

Figure 29A:
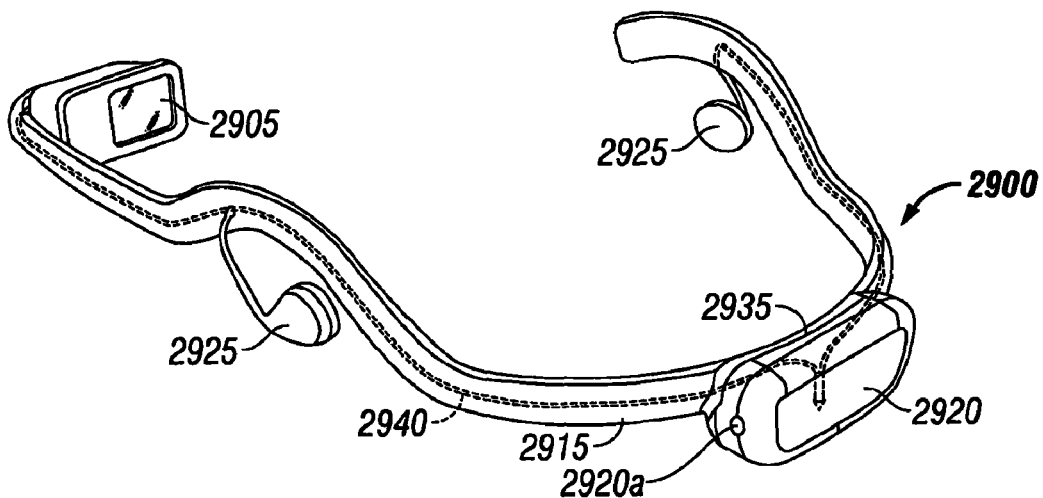
FIGS. 29A through 29C shown an embodiment with a clam shell housing that is removable from the monocular device.
Figure 29B:
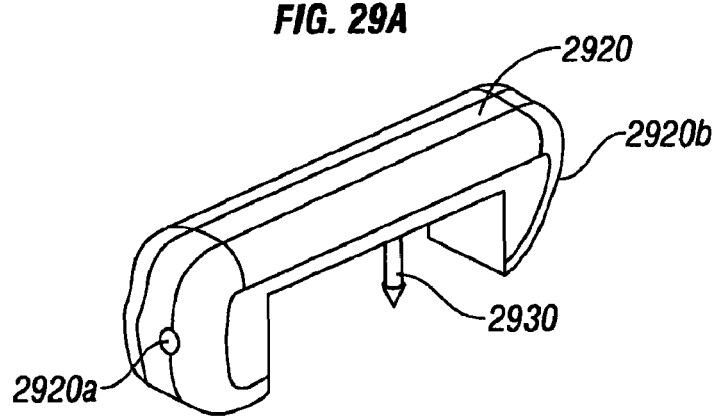
Figure 29C:
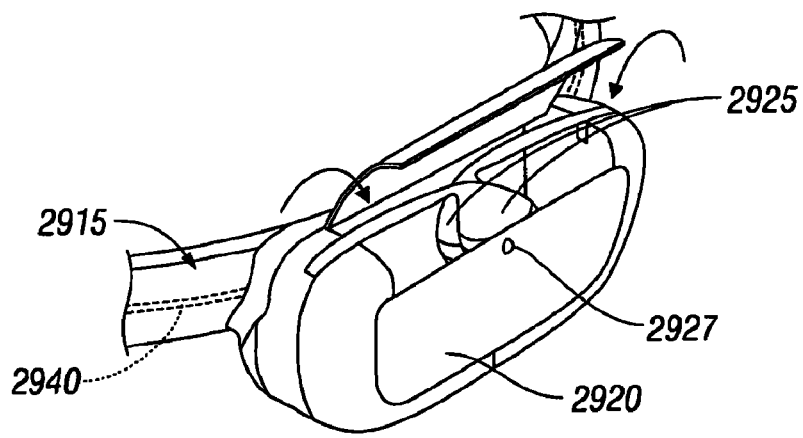

Turning now to FIG. 29A-29C, there is shown yet an alternative embodiment of the present disclosure shown as reference number 2900. Preferably, in this embodiment, the monocular device 2900 includes a display 2905 supported on a support band member 2915 which extends completely around the rear of the wearer's head; however, the rear of the support structure 2915 includes a clam shell type housing 2920 for housing one or more components of the device 2900. It should be appreciated that although being shown in the rear 2915, the housing 2920 may be placed on the sides or even behind the display 2905, and is not limited to any specific location. Additionally, the clam shell housing 2920 may have different shapes or sizes and is not limited to the specific geometry or size shown. Preferably, the housing 2920 includes an interior space for storage purposes shown in FIG. 29C. Numerous components may be housed in the clam shell housing 2920 including ear buds 2925, batteries (not shown), or any other specific electronic or mechanical component that can be used with the monocular device 2900, and/or removably coupled to a circuit board to provide increased functionality to the device 2900.

In one embodiment, the housing 2920 may store items including a carrying case for the display 2905 or a input device, or a device to increase a functionality of the device 2900. Various components are possible and within the scope of the present disclosure.

In one preferred embodiment, the clam shell type housing 2920 preferably may open and close with a snap fastener 2927 shown in FIG. 29C. Preferably, the entire clam shell housing 2920 may be selectively removed from the support structure 2915 as shown in FIG. 29B. Preferably, the clam shell housing 2920 includes an electronic connector 2930, such as, for example, a 3.5 mm plug. Other plugs are also envisioned, and the plug should be small, and preferably the plug described forms no limitation to the present disclosure. The connector 2930 (FIG. 29B) preferably operatively couples to a power supply line or board (not shown) of the device 2900 through an aperture formed in the location 2935 (FIG. 29A) that is formed in the rear member band 2915 of the support structure 2910.

Additionally, turning again to FIG. 29B, the clam shell housing 2920 includes a first and a second aperture 2920*a*, 2920*b* that are disposed through the lateral sides of the clam shell housing 2920, and preferably the ear buds 2925 extend through the apertures 2920*a*, 2920*b*. Wireless ear phones (not shown) are also envisioned, and the present device 2900 may include a wireless interface stored in the housing 2920.

Alternatively, the ear buds 2925 are preferably connected to a retractable tether 2740 (FIG. 29C). The tether 2940 is preferably connected to a retractable spool (not shown) or similar tensioning device in the clam shell housing 2920. It is envisioned that the user may control retraction of the tether 2940. Actuation may of a manual device or motor extends the ear buds 2925 from the retracted position, and correctly orients the ear buds 2925 from the clam shell housing 2920, and to a position generally adjacent to the ears of the wearer.

Figure 30A:
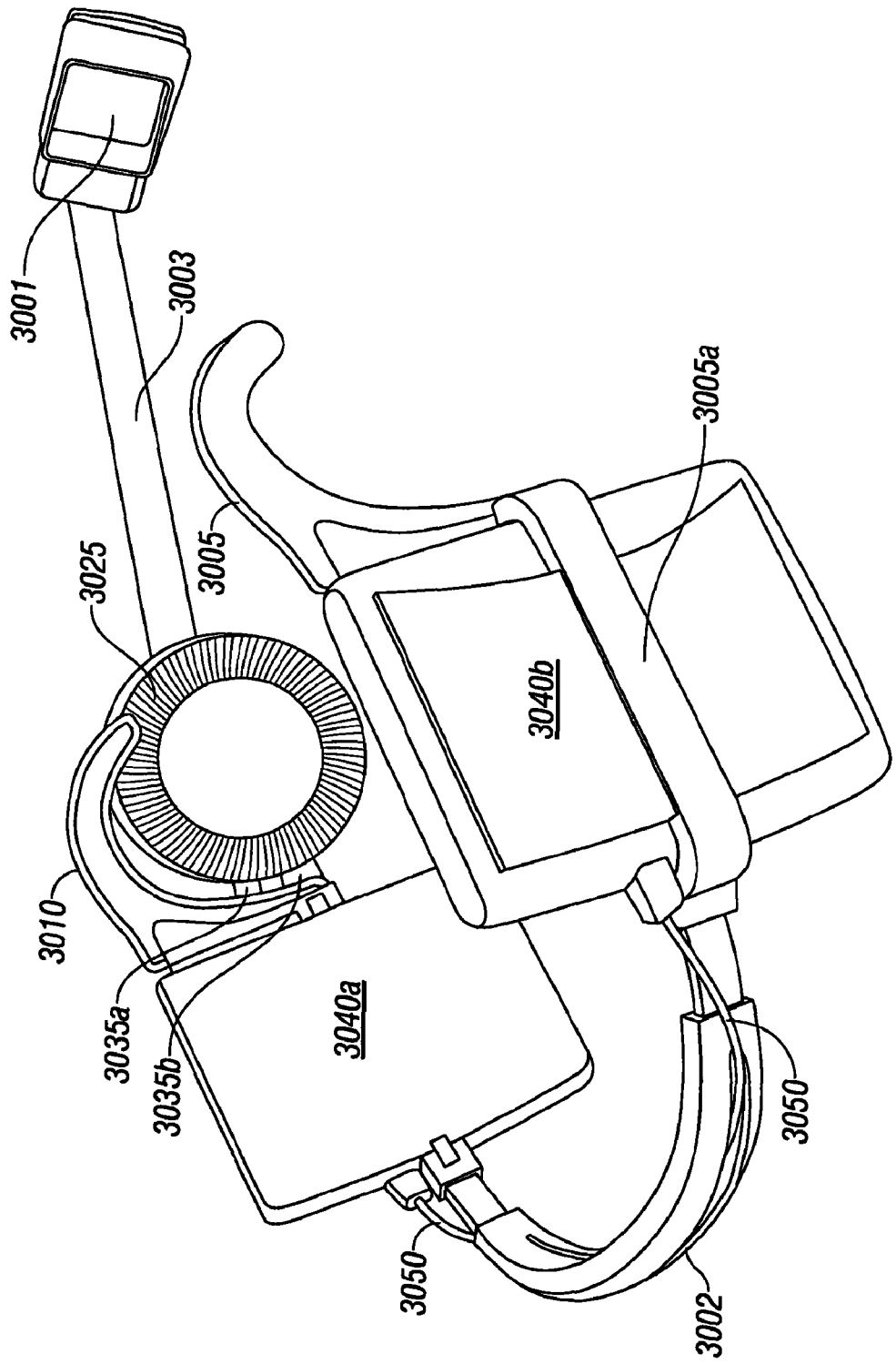
FIGS. 30A-30B show an embodiment with first and second housings for storing functional components of the device.
Figure 30B:
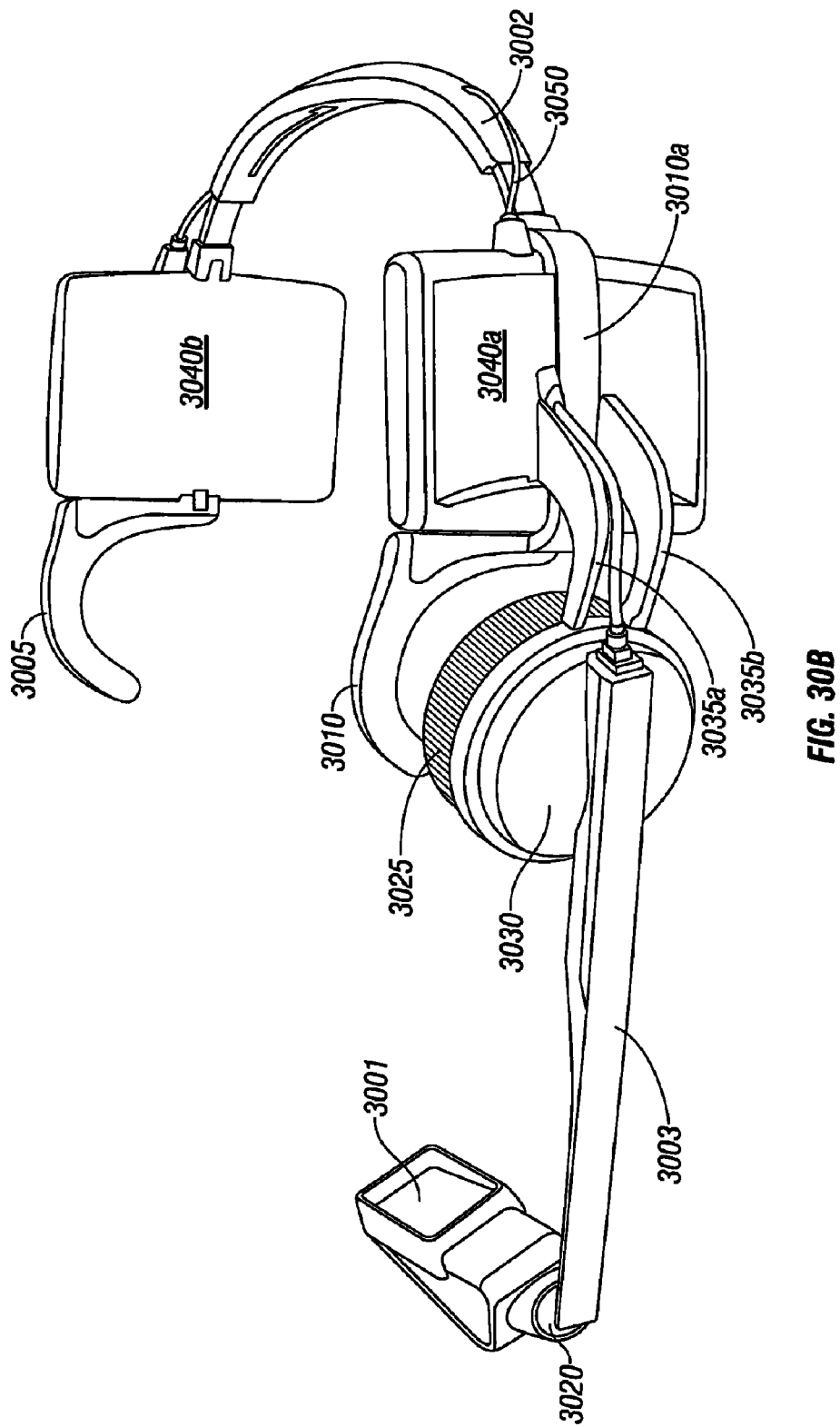

Turning now to FIGS. 30A-30B, there is shown an alternative embodiment of the present disclosure of the monocular display device 3000. In this embodiment, the device 3000 includes a display 3001. The display 3001 is connected to a support structure 3002 by an arm 3003. The device 3000 also includes a first ear loop 3005, and a second ear loop 3010.

As shown in FIG. 30B, the display 3001 may be connected to the arm 3003 by a swivel or pivot connection 3020 as previously described for multiple degrees of adjustment. As shown in FIGS. 30A-30B, the support structure 3002 preferably extends around the rear of the head of the wearer, and acts to connect the display 3001 and arm 3003 to both ear loops 3010, and 3005 by respective bars 3005*a*, 3010*a*.

In this embodiment, the first and the second ear loops 3005, 3010 are adjustable. The first and the second ear loops 3005, 3010 may further comprise an internal member (not shown) that is deformable, which retains a desired shape upon deforming. This allows the first and the second ear loop 3005, 3010 to bend to a desired shape by the user for form fitting and to allow for maximum comfort. The ear loops 3010, and 3005 are preferably soft members, and suitable for a head wearable apparatus 3000.

Turning to FIG. 30B, the monocular display device 3000 includes a speaker 3025 that is supported by a speaker housing 3030. The housing 3030 is connected to the arm 3003 by a connector, such as a weld, an adhesive or by other suitable method. The speaker housing 3030 is also connected to the bar 3010a by arched supports 3035a, and 3035b. Arched supports 3035a, 3035b are resilient members, and connect the speaker housing 3030 to the bar 3010a, which is also connected to the support structure 3002 for additional support. Arched supports 3035a, and 3035b are also connected to a first housing 3040a.

The device 3000 of this embodiment advantageously includes two thin lightweight housings 3040a and 3040b. Housings 3040a, and 3040b are generally orthogonal shaped and include a smooth surface to contact the user's head when worn. Housings 3040a, and 3040b are preferably very thin, and lightweight.

The housings 3040a, and 3040b preferably house one or more functional or electronic components of the device, and include a wired connection 3050 that passes therethrough to connect the respective electronic components of the device 3000 with the power supply (not shown). Various component configurations are possible and within the scope of the present disclosure, and there may be a wireless transceiver, a circuit board, a digital signal processor, memory, media players, media card, or any mobile computing device component known in the art stored therein.

In the preferred embodiment, one of the housings 3040a or 3040b may include an Advanced RISC Machine (ARM)/Digital Signal Processor (DSP) (not shown) (which may be a DaVinci series TMS320 processor, available from Texas Instruments of Dallas, Tex.), one or more memory chips (not shown), a Bluetooth interface, a display driver (which may, for example, be an SSD1508 display driver available from Kopin Corporation of Westborough, Mass.), one or more video level shifter circuits, a power supply (i.e., provided by a battery), a universal receiver transmitter (UART) (such as may be used for debugging) and a memory.

A number of buttons and an LED may be associated with the device 3000 and protrude from one or both of the housings 3040a, 3040b or other locations (e.g., switch 1/switch 2/switch 3 and reset inputs).

A VGA quality display and audio input and output device (s), which may include microphone input and stereo outputs may also be housed therein. A Secure Digital (SD), eXteme Digital (xD), USB integral SD (uSD) memory or other similar interfaces may be stored in the housings 3040a, 3040b and used to store application programs, kernel directives, or configuration data, and/or connect to external devices, such as, for example, a digital camera.

Preferably, a circuit board (not shown) with electronics is moved to behind one ear in, for example, in housing 3040a, and a battery or power supply (not shown) will reside behind the other ear or in housing 3040b for a balanced arrangement.

The speaker 3025 could be large, as shown, or perhaps smaller, like an ear bud shown in FIG. 29C. The ear loops 3010, 3005 preferably may rotate previously as described, or could be removed, inverted, then reattached, thus achieving the desired effect to move the display 3001 from viewing with the left eye to viewing with the opposite right eye as previously described.

While this invention has been particularly shown and described with references to example embodiments thereof, it will be understood by those skilled in the art that various changes in form and details may be made therein without departing from the scope of the invention encompassed by the appended claims.

What is claimed is:

1. A head mounted monocular display support system being convertible from a right eye display to a left eye display comprising:
    an ear loop;
    a rear support connected to the ear loop, and extending around at least a portion of the head of the wearer;
    a cantilevered support member for supporting a display and connected to the ear loop;
    the head mounted monocular display support system being arranged for viewing the display with a right eye;
    the head mounted monocular display support system being convertible for viewing the display with a left eye;
    a first pivot being between the cantilevered support member and the ear loop; and
    a second pivot being between the ear loop and the rear support.

2. The head mounted monocular display support system of claim 1, wherein the head mounted monocular display support system is convertible for viewing the display with the left eye by rotating the cantilevered support member by the first pivot and by rotating the rear support by the second pivot to move the rear support to the opposite ear of the wearer.

3. The head mounted monocular display support system of claim 1, wherein at least one of the ear loop, the cantilever support member, and the rear support include an interior space for housing a component.

4. The head mounted monocular display support system of claim 1, wherein the cantilevered support member is configured to move longitudinally relative to the ear loop.

5. The head mounted monocular display support system of claim 1, wherein the ear loop is a first ear loop and further comprising a second ear loop;
    the first ear loop being rotatably connected to the rear support;
    the second ear loop being rotatably connected to the rear support;
    the cantilever support member being rotatable about a pivot relative to the rear support; wherein the head mounted monocular display support system is suitable for viewing the display with right eye, and the head mounted monocular display support system is convertible for viewing the display with the left eye by rotating the first and the second ear loops, and by inverting the entire head mounted monocular display support system 180 degrees.

6. The head mounted monocular display support system of claim 5, further comprising a member connecting the cantilevered support member to the rear support, the member including the pivot to permit the rotation of the cantilevered support member relative to the rear support.

7. The head mounted monocular display support system of claim 5, wherein the cantilevered support member is slidably supported relative to the rear support.

8. The head mounted monocular display support system of claim 1, further comprising a frame including the rear support, the ear loop, an intermediate member, and a display support;
    wherein the rear support is rotatably connected to the ear loop for supporting the ear loop on a first ear;

wherein the intermediate member is connected to an opposite end of the ear loop relative to the rear support;
wherein the intermediate member is connected to the display support;
wherein the display is rotatably connected to the display support with the frame suitable for viewing the display with a first eye; and
wherein the frame is convertible for viewing the display with an opposite eye by rotating the display about the intermediate member about 180 degrees, rotating the rear support, and supporting the ear loop on an opposite ear.

9. A head mounted monocular display comprising:
a display being arranged relative to a wearer's eye;
a housing connected to the display;
an ear loop connected to the housing, the ear loop substantially surrounding an ear of the wearer, the ear loop supporting the display relative to the wearer's eye by employing a cantilevered support member supported from the ear of the wearer;
a support member being connected to at least one of the display and the housing, the support member supporting the display in a different location than a first location defined as around an ear of the wearer;
a first pivot being between the cantilevered support member and the ear loop; and
a second pivot being between the ear loop and a rear support, the rear support connected to the ear loop, and extending around at least a portion of the head of the wearer.

10. The head mounted monocular display of claim 9, wherein the display is telescopically connected to the housing by a telescoping arm.

11. The head mounted monocular display of claim 9, wherein the display pivots relative to the housing.

12. The head mounted monocular display of claim 9, further comprising an arm connecting the display to the housing, the arm articulating for adjustment of the display.

13. The head mounted monocular display of claim 9, further comprising an arm connecting the housing with the display, the arm slidably supported in a channel formed in the housing, the arm adapted for longitudinal movement relative to the housing; and
wherein the housing includes a cushion that contacts at least a portion of the head of the wearer.

14. The head mounted monocular display of claim 9, further comprising an audio transducer element operatively connected to a power supply that outputs audio to the wearer.

15. The head mounted monocular display of claim 9, further comprising a support member being connected to at least one of the display and the housing, the support member supporting the display in a different location than a first location defined as around an ear of the wearer.

16. The head mounted monocular display of claim 15, wherein the housing is generally elongated, and the support member is configured for supporting the display on at least a portion of the face of the wearer.

17. The head mounted monocular display of claim 15, further comprising a cushion connected to at least a portion of the display, wherein the cushion contacts at least a portion of the face of the wearer.

18. The head mounted monocular display of claim 15, wherein the housing is weighted with a weight, and wherein the weight is positioned to move a total center of gravity of the housing closer to the ear loop relative to the display.

19. The head mounted monocular display of claim 18, wherein the ear loop is weighted with the weight, and wherein the weight moves the total center of gravity of the housing closer to the ear loop relative to the display.

20. The head mounted monocular display of claim 15, wherein the support member is a silicon pad being connected to the display element.

21. The head mounted monocular display of claim 15, further comprising an adhesive on the support member, the support member configured for supporting and adhering the display on the face of the wearer.

22. The head mounted monocular display of claim 15, wherein the support member is moveable between at least two positions including a first position configured for supporting the display on at least a portion of the face of the wearer and a second position wherein the display is elevated relative to the face of the wearer.

23. The head mounted monocular display of claim 9, further comprising a support structure including a plurality of ear loops supported on each of the wearer's ears that supports at least the monocular display; and
the plurality of ear loops including a first ear loop connected to a member that is connected to a second ear loop of the plurality of ear loops, the member extending along a portion of the wearer's head to distribute an overall weight of the apparatus.

24. The head mounted monocular display of claim 23, wherein the monocular display is telescopically connected to a housing by a telescoping arm, and the housing is connected to at least one of the plurality of ear loops, the at least one ear loop supporting the monocular display.

25. The head mounted monocular display of claim 23, wherein the member is a bar that extends along a rear of the wearer's head.

26. The head mounted monocular display of claim 23, wherein the member is a bar that extends along a rear of the wearer's head, and that is collapsible for storage.

27. The head mounted monocular display of claim 23, wherein the monocular display is pivotally connected to a housing that is connected to at least one of the plurality of ear loops.

28. The head mounted monocular display of claim 23, wherein at least one ear loop includes a cushion that contacts the ear of the wearer.

29. The head mounted monocular display of claim 23, wherein the member includes a cushion that contacts the head of the wearer.

30. The head mounted monocular display of claim 23, further comprising a compartment that houses at least one component of the apparatus.

31. The head mounted monocular display of claim 30, wherein the component comprises at least one of a processor, a memory, a wireless communication interface, a video circuit, a power supply, a receiver, a transmitter, and any combination thereof.

32. A head mounted monocular display comprising:
a display being arranged relative to a wearer's eye;
a housing connected to the display to an ear loop by a first link;
a support member being connected to the housing that supports the display relative to the wearer's eye;
a rear loop connected to the ear loop, and extending around at least a portion of the head of the wearer;
a first pivot link being between the support member and the ear loop; and
a second pivot link being between the ear loop and the rear support.

33. The head mounted monocular display of claim 32, further comprising a plurality of links with at least the first pivot link connected to the second pivot link, the plurality of links connecting the display with the housing, the first pivot link being adapted to articulate relative to the second pivot link.

34. The head mounted monocular display of claim 32, wherein at least some of the plurality of links are longitudinally moveable relative to the housing and extend between at least two positions with at least a first position being in the housing, and at least a second position being outside of the housing.

35. The head mounted monocular display of claim 32, wherein the display is moveable to a position that is generally in front of a wearer's eye, and to a different position in the peripheral view of the wearer.

* * * * *